(12) United States Patent
Kujirai et al.

(10) Patent No.: US 6,278,524 B1
(45) Date of Patent: Aug. 21, 2001

(54) PRINTING CONTROL APPARATUS AND METHOD

(75) Inventors: Yasuhiro Kujirai, Tokyo; Koji Nakagiri; Satoshi Nishikawa, both of Kawasaki; Yasuo Mori, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/104,780

(22) Filed: Jun. 26, 1998

(30) Foreign Application Priority Data

Jul. 2, 1997 (JP) .................................................. 9-177279

(51) Int. Cl.$^7$ .................................................. G06F 15/00
(52) U.S. Cl. .......................................... 358/1.11; 358/468
(58) Field of Search ...................................... 358/1.11, 1.2, 358/1.9, 1.12, 1.13, 1.14, 1.15, 1.17, 468

(56) References Cited

U.S. PATENT DOCUMENTS

| | | | | |
|---|---|---|---|---|
| 5,383,754 | * | 1/1995 | Sumida et al. | 412/11 |
| 5,659,846 | * | 8/1997 | Yoshioka | 399/85 |
| 5,731,879 | * | 3/1998 | Maniwa et al. | 358/296 |
| 5,815,289 | * | 9/1998 | Yoshida et al. | 358/468 |
| 5,872,900 | * | 2/1999 | Tsuchitoi | 395/111 |

* cited by examiner

Primary Examiner—Joseph Mancuso
Assistant Examiner—Douglas Tran
(74) Attorney, Agent, or Firm—Fitzpatrick, Cella, Harper & Scinto

(57) ABSTRACT

Pages of printing paper to undergo printing are decided successively and are caused to be printed on by a printer in accordance with paper supply and discharge orientations and total number of pages in such a manner that the paper is printed first on its front side, reset in the printer and then printed on its reverse side. When printing on the front side is finished, the operator is instructed to reset the paper in the printer. At such time a display is presented indicating how the paper to be reset in the printer should be placed at a paper supply port, this being decided upon taking into account (1) the orientation of an image with respect to the paper it is printed on, (2) the paper supply port, (3) the side of the paper to be faced down when it is fed through the printer, (4) the orientation of the paper when it is fed through the printer and (5) the position of a binding margin. If the operator sets the printing paper in accordance with the display, the desired images can be printed on both sides of the paper in such a manner that the paper may be bound in the desired orientation.

53 Claims, 22 Drawing Sheets

FIG. 5

| TYPE OF PAPER FEED \ TYPE OF PAPER DISCHARGE | FACE UP | FACE DOWN |
|---|---|---|
| FACE UP | COMPUTATION TYPE 1 | COMPUTATION TYPE 2 |
| FACE DOWN | COMPUTATION TYPE 3 | COMPUTATION TYPE 4 |

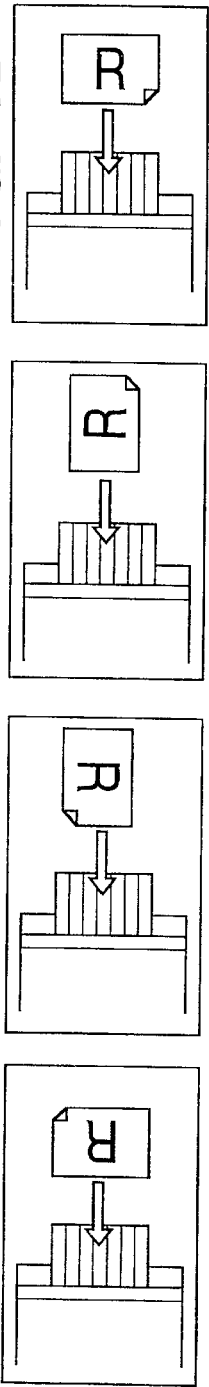
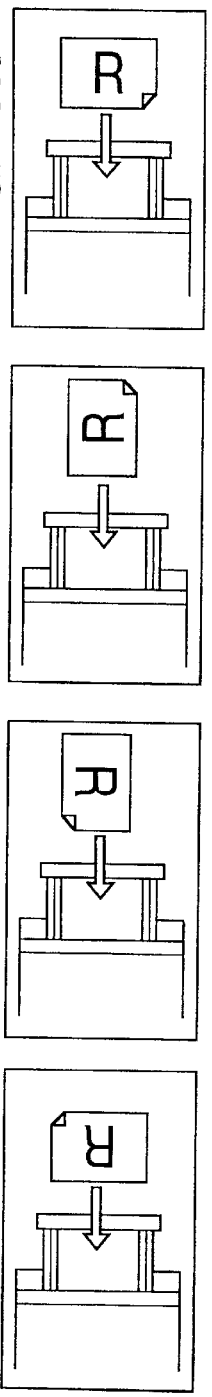
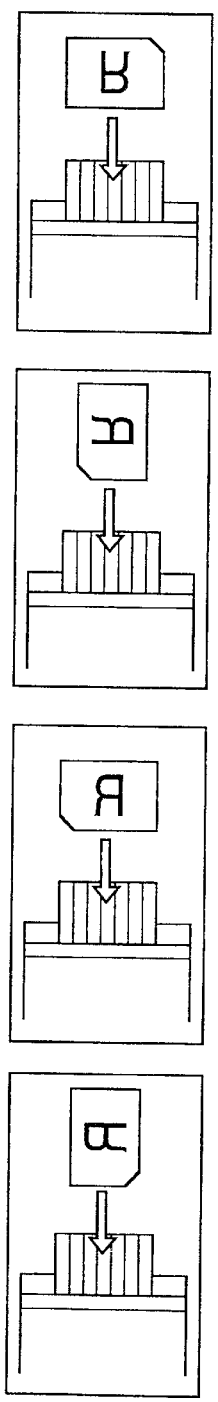
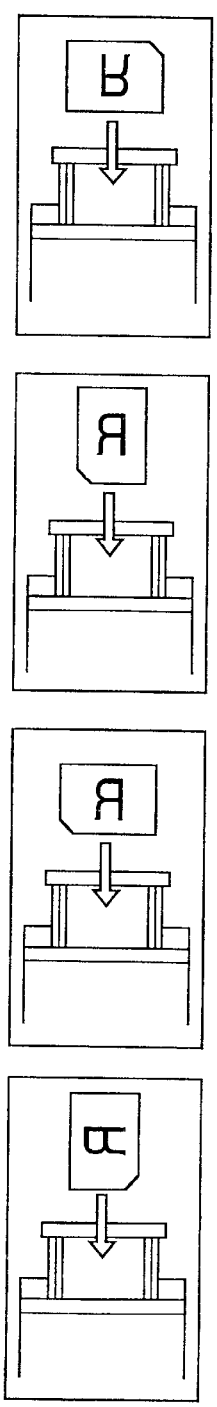

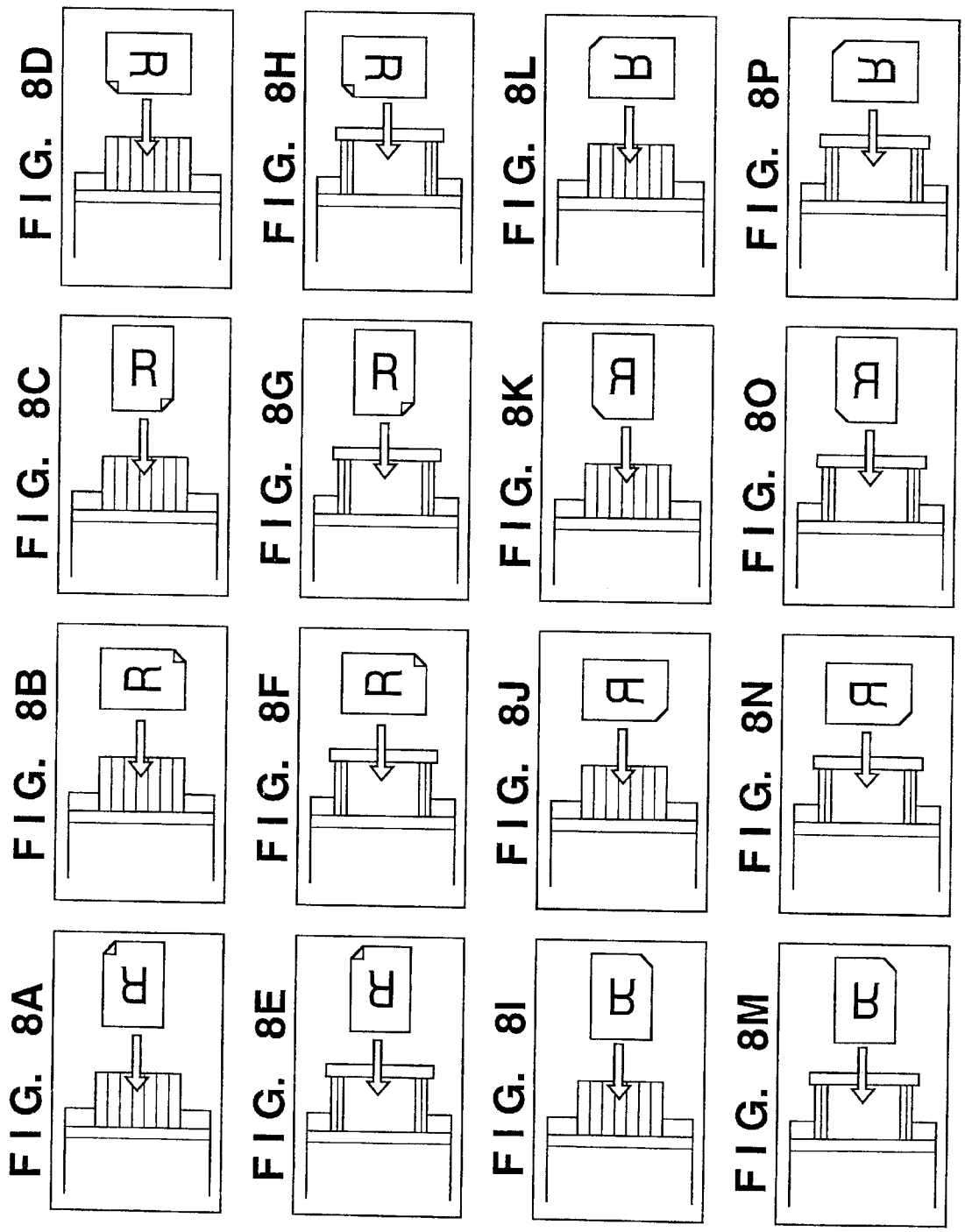

FIG. 11

| | PAGE NUMBER OF LOGICAL PAGE TO BE PRINTED FIRST |
|---|---|
| COMPUTATION TYPE 1 | FINAL PAGE OF PAGES PRINTED (BLANK PAGE IN CASE OF ODD-NUMBERED PAGE DATA) |
| COMPUTATION TYPE 2 | FINAL PAGE OF PAGES PRINTED (BLANK PAGE IN CASE OF ODD-NUMBERED PAGE DATA) |
| COMPUTATION TYPE 3 | SECOND PAGE |
| COMPUTATION TYPE 4 | SECOND PAGE |

FIG. 12

| | |
|---|---|
| COMPUTATION TYPE 1 | PAGE NUMBER OF LOGICAL PAGE TO BE PRINTED FIRST ON PHYSICAL PAGE |
| COMPUTATION TYPE 2 | FINAL PAGE OF PRINT DATA (OUTPUT BLANK PAGE IN CASE WHERE BLANK-PAGE CRITERIA ARE SATISFIED) |
| COMPUTATION TYPE 3 | FINAL PAGE OF PRINT DATA (OUTPUT BLANK PAGE IN CASE WHERE BLANK-PAGE CRITERIA ARE SATISFIED) |
| COMPUTATION TYPE 4 | NUMBER WHICH IS TWICE THE NUMBER OF LOGICAL PAGES PRINTED ON ONE PHYSICAL PAGE |
| | NUMBER WHICH IS TWICE THE NUMBER OF LOGICAL PAGES PRINTED ON ONE PHYSICAL PAGE |

PRINT ON THIS SIDE OF STACKED PAPER

PRINT ON THIS SIDE OF STACKED PAPER

FIG. 18

| PAPER ORIENTATION | SUPPLY PORT | SIDE FACED DOWN | PAPER ORIENTATION WITH RESPECT TO SUPPLY PORT | A | B |
|---|---|---|---|---|---|
| PORTRAIT | MANUAL-INSERTION TRAY | FRONT SIDE (FACE UP) | LONG EDGE | | |
| | | | SHORT EDGE | | |
| | | REVERSE SIDE (FACE DOWN) | LONG EDGE | | |
| | | | SHORT EDGE | | |
| | CASSETTE | FRONT SIDE (FACE UP) | LONG EDGE | | |
| | | | SHORT EDGE | | |
| | | REVERSE SIDE (FACE DOWN) | LONG EDGE | | |
| | | | SHORT EDGE | | |
| LANDSCAPE | MANUAL-INSERTION TRAY | FRONT SIDE (FACE UP) | LONG EDGE | | |
| | | | SHORT EDGE | | |
| | | REVERSE SIDE (FACE DOWN) | LONG EDGE | | |
| | | | SHORT EDGE | | |
| | CASSETTE | FRONT SIDE (FACE UP) | LONG EDGE | | |
| | | | SHORT EDGE | | |
| | | REVERSE SIDE (FACE DOWN) | LONG EDGE | | |
| | | | SHORT EDGE | | |

FIG. 19A
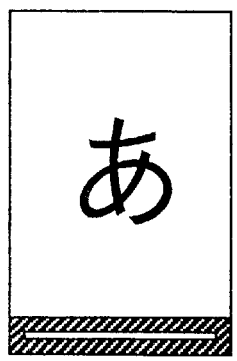
FIG. 19B
FIG. 19C
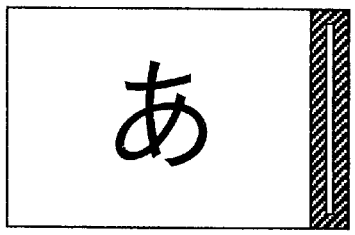
FIG. 19D
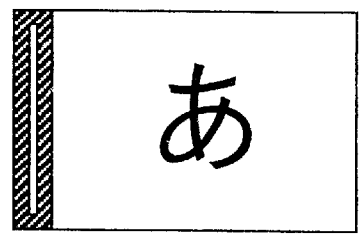
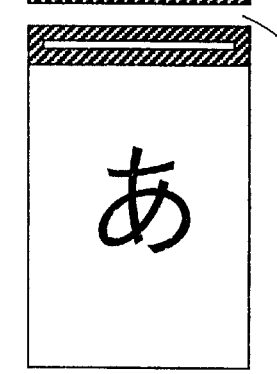
BINDING ALONG SHORT EDGE
FIG. 19E
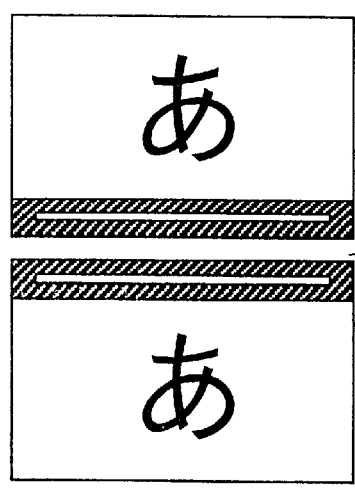
FIG. 19F
FIG. 19G
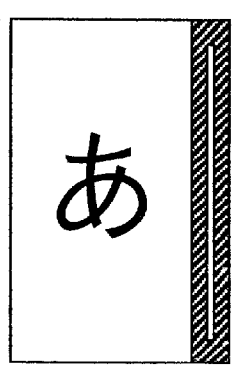
FIG. 19H
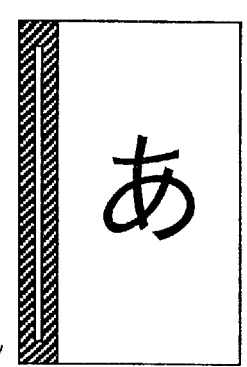
BINDING ALONG LONG EDGE

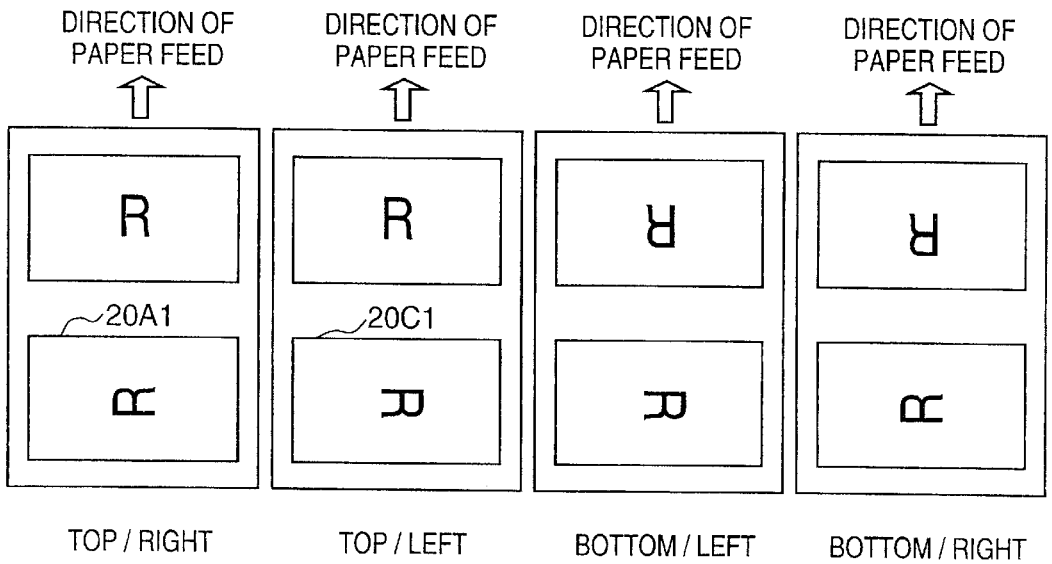
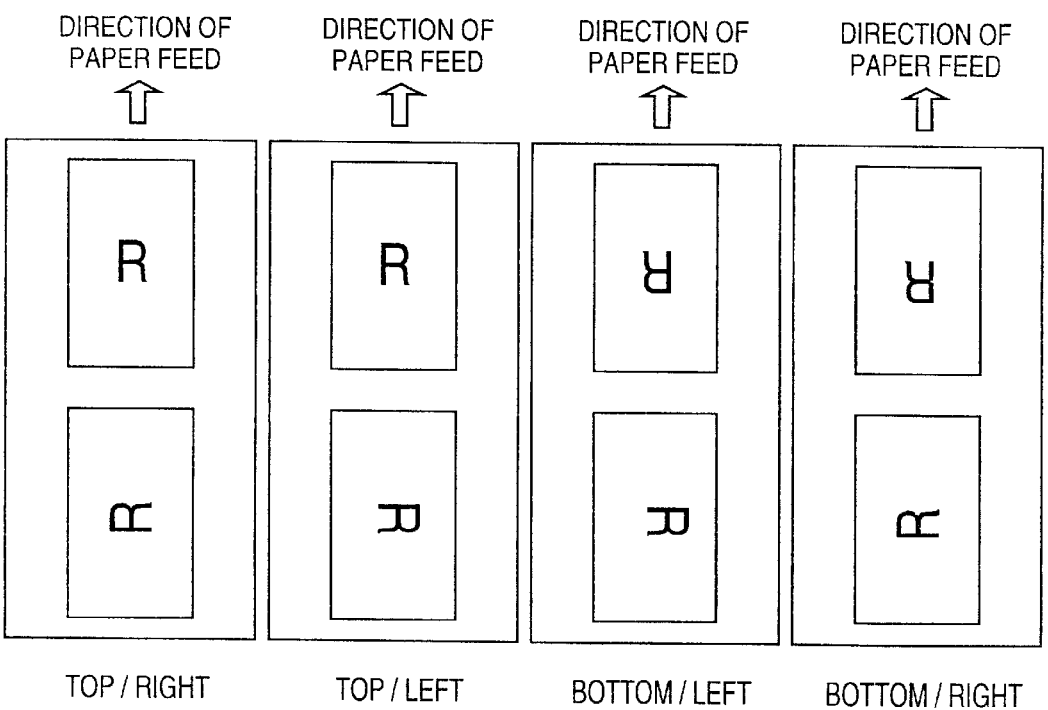

FIG. 22A

| FACE-UP PAPER FEED | TRANSPORT DIRECTION | |
|---|---|---|
| | LEFT OR TOP | RIGHT OR BOTTOM |
| BINDING ALONG LONG EDGE | A | B |
| BINDING ALONG SHORT EDGE | B | A |

FIG. 22B

| FACE-DOWN PAPER FEED | TRANSPORT DIRECTION | |
|---|---|---|
| | LEFT OR TOP | RIGHT OR BOTTOM |
| BINDING ALONG LONG EDGE | B | A |
| BINDING ALONG SHORT EDGE | A | B |

PRINTING CONTROL APPARATUS AND METHOD

BACKGROUND OF THE INVENTION

This invention relates to a printing control apparatus and method and, more particularly, to EL printing control apparatus and method for performing double-sided printing by the intervention of an operator using a printing apparatus capable of single-sided printing.

When printing is performed on both sides of paper for a purpose such as paper conservation using a printing apparatus not equipped with a double-sided print unit for double-sided printing, the operator must decide the order in which pages are output from the apparatus. In order to decide the page output order, it is necessary to take into account the orientation in which paper is fed through the printing apparatus as well as the way in which paper is discharged from the printing apparatus.

In such manual double-sided printing according to the prior art, the user must change the order in which pages are output by a software application by considering the order in which the printing apparatus is attempting to output the pages. It is necessary, therefore, to try test printing in order that the user may ascertain the orientation in which paper is fed through the printing apparatus and the way in which paper is discharged from the apparatus. Then, based upon the obtained knowledge concerning the paper feeding orientation and the way paper is discharged, the user must give consideration to printing appearance and format and change the page output order so as to obtain the output intended.

To print on the reverse side of a sheet of paper discharged from a printing apparatus after the front of the paper has been printed on, the sheet of paper must be fed through the apparatus again. This requires that the paper be placed in the paper supply port or in a paper supply tray. The operator must know what the orientation of the paper should be at this time.

Thus, manual double-sided printing according to the prior art compels the operator to perform a complicated operation and results in the wasting of paper owing to test printing.

SUMMARY OF THE INVENTION

Accordingly, an object of the present invention is to provide a printing control apparatus and method in which, when double-sided printing is preformed using a single-sided printing apparatus, the operator need not perform a complicated operation and test printing and is capable of rearranging the paper in a simple manner.

According to the present invention, the foregoing object is attained by providing a printing control apparatus connected to a printing apparatus which prints continuously on one side of a printing medium, comprising characteristic reading means for reading, from the printing apparatus, characteristic information which includes orientation of the printing medium at supply and discharge thereof, setting input means for entering a printing setting, printing request means for deciding, on the basis of the characteristic information read by the characteristic reading means, the printing setting entered by the setting input means and number of pages to be printed, a page order in which the printing apparatus is to be made to output pages to perform printing on both sides of the printing medium, and causing the printing apparatus to perform printing in the order decided, and printing-medium rearrangement request means which, in a case where number of pages caused to be printed by the printing request means has reached half the total number of pages, requests rearrangement of the printing medium upon specifying an orientation in which the printing medium should be re-supplied to the printing apparatus, based upon the characteristic information read by the characteristic reading means and the printing setting entered by the setting input means.

Further, according to the present invention, the foregoing object is attained by providing a printing control method for controlling a printing apparatus which prints continuously on one side of a printing medium, comprising a characteristic reading step of reading, from the printing apparatus, characteristic information which includes orientation of the printing medium at supply and discharge thereof, a setting input step of entering a printing setting, a printing request step of deciding, on the basis of the characteristic information read at the characteristic reading step, the printing setting entered at the setting input step and number of pages to be printed, a page order in which the printing apparatus is to be made to output pages to perform printing on both sides of the printing medium, and causing the printing apparatus to perform printing in the order decided, and a printing-medium rearrangement request step of requesting rearrangement of the printing medium upon specifying an orientation in which the printing medium should be re-supplied to the printing apparatus, based upon the characteristic information read at the characteristic reading step and the printing setting entered at the setting input step, in a case where number of pages caused to be printed at the printing requesting step has reached half the total number of pages.

The present invention further provides a printing system comprising a printing apparatus which prints continuously on one side of a printing medium, and a printing control apparatus connected to the printing apparatus, wherein the printing control apparatus includes characteristic reading means for reading, from the printing apparatus, characteristic information which includes orientation of the printing medium at supply and discharge thereof, setting input means for entering a printing setting, and printing request means for deciding, on the basis of the characteristic information read by the characteristic reading means, the printing setting entered by the setting input means and number of pages to be printed, a page order in which the printing apparatus is to be made to output pages to perform printing on both sides of the printing medium, and causing the printing apparatus to perform printing in the order decided, and the printing apparatus includes printing-medium rearrangement request means which, in a case where number of pages caused to be printed by the printing requesting means has reached half the total number of pages, requests rearrangement of the printing medium upon specifying an orientation in which the printing medium should be re-supplied to the printing apparatus, based upon the characteristic information read by the characteristic reading means and the printing setting entered by the setting input means.

Further, the present invention provides a storage medium storing a computer readable program executed in a printing control apparatus connected to a printing apparatus which prints continuously on one side of a printing medium, the program having characteristic reading means for reading, from the printing apparatus, characteristic information which includes orientation of the printing medium at supply and discharge thereof, setting input means for entering a printing setting, printing request means for deciding, on the basis of the characteristic information read by the characteristic reading means, the printing setting entered by the setting input means and number of pages to be printed, a page order in which the printing apparatus is to be made to output pages to perform printing on both sides of the printing medium, and causing the printing apparatus to perform printing in the order decided, and printing-medium rearrangement request means which, in a case where number of pages caused to be printed by the printing requesting means has reached half the total number of pages, requests rearrangement of the printing medium upon specifying a direction in which the printing medium should be re-supplied to the printing apparatus, based upon the characteristic information read by the characteristic reading means and the printing setting entered by the setting input means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram showing the relationship between hardware characteristics and types of computation;

FIGS. 7A through 7P are diagrams showing patterns representing methods of requesting a user to turn over a page;

FIGS. 8A through 8P are diagrams showing patterns representing methods of requesting a user to turn over a page;

FIG. 11 is a diagram showing a page for which printing is requested first in accordance with type of computation;

FIG. 12 is a diagram illustrating number of pages for which printing is requested first in accordance with type of computation in a case where printing of a plurality of logical pages is performed per one physical page;

FIG. 18 is a diagram illustrating the correspondence between printing settings and a displayed dialog screen;

FIGS. 19A through 19H are diagrams useful in describing binding margins;

FIGS. 20A through 20H are diagrams useful in describing the positional relationship between a paper supply port and print data;

FIGS. 22A and 22B are diagrams illustrating a method of selecting a symbol shown in FIG. 8.

DESCRIPTION OF THE PREFERRED EMBODIMENT

A printing system will be described as a preferred embodiment to which the present invention is applied.
<Configuration of Printing System>

Figure 1:
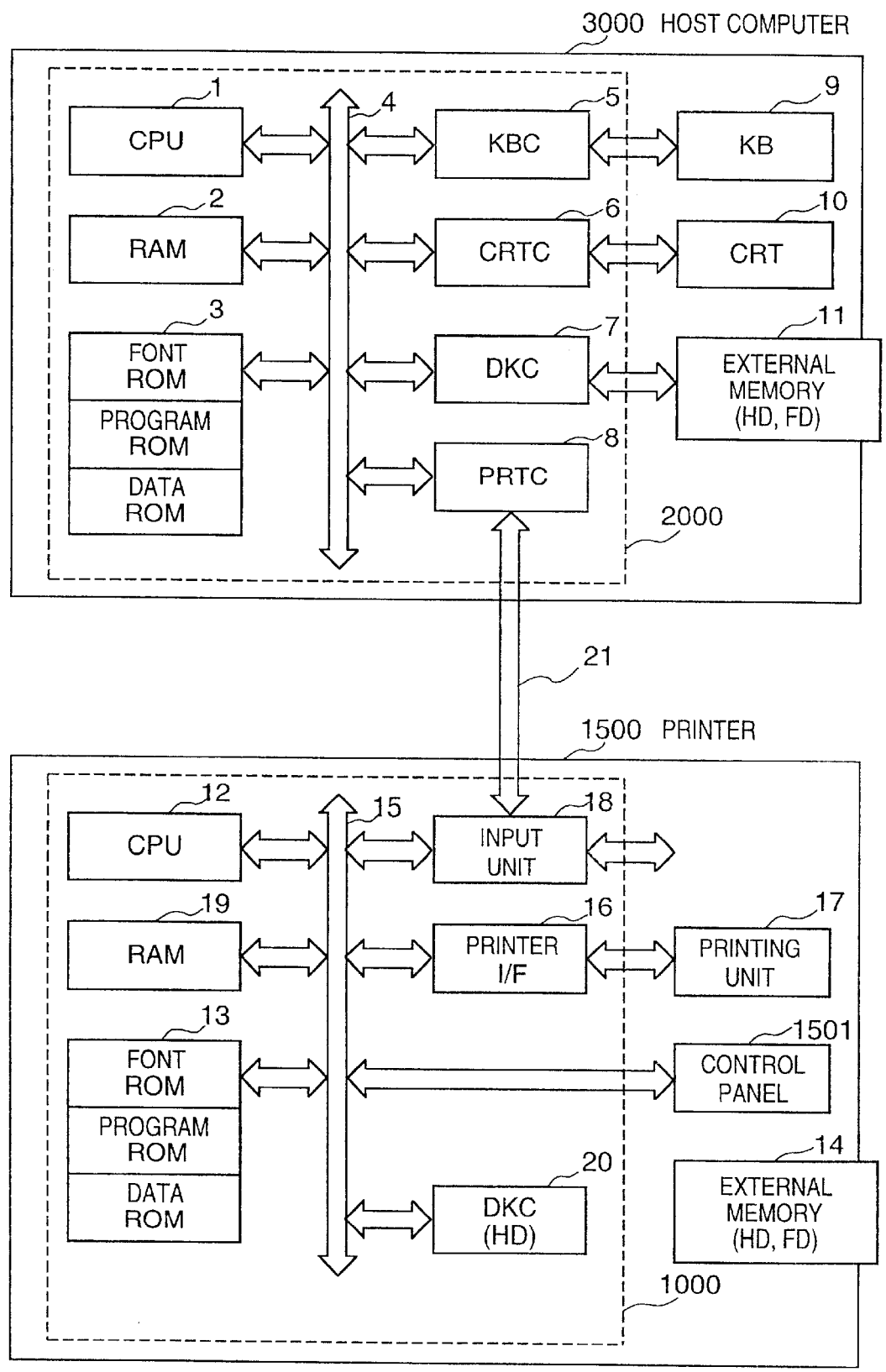
FIG. 1 is a block diagram of a printing system according to an embodiment of the present invention.

FIG. 1 is a block diagram illustrating a printer control system according to this embodiment. It should be noted that as long as the functions of the present invention are executed, the arrangement of the invention may be a standalone device, a system comprising a plurality of devices or a system in which processing is executed upon making a connection via a network such as a LAN or WAN.

The system shown in FIG. 1 includes a host computer 3000 having a CPU 1 which, on the basis of a programming ROM in a ROM 3 or a document processing program that has been stored in an external memory 11, executes the processing of a document containing mixed objects such as graphics, images, characters and tables (inclusive of spreadsheets, etc.). The CPU 1 performs overall control of various devices connected to a system bus. An operating system, which is the control program of the CPU 1, is stored in a program ROM of the ROM 3 or in the external memory 11. Font data used when the above-mentioned document processing is executed is stored in a font ROM of the ROM 3 or in the external memory 11. Various data used when the above-mentioned document processing is executed is stored in a data ROM of the ROM :3 or in the external memory 11. The RAM 2 functions as the main memory and work area of the CPU 1.

A keyboard controller (KBC) 5 controls inputs from a keyboard 9 and pointing device, which is not shown. A CRT controller (CRTC) 6 controls the display on a CRT display (CRT) 10. A disk controller (DKC) 7 controls access to the external memory 11, such as a hard disk (HD) or floppy disk (FD). The hard disk stores a booting program, various applications, font data, user files, edited files and a program (referred to as a "printer driver" below) for generating printer control commands. A printer controller (PRTC) 8, which is connected to a printer 1500 via a bidirectional interface 21, executes processing for controlling communication with the printer 1500.

The CPU 1 executes processing to rasterize outline fonts in a RAM area, provided in, say, the RAM 2, that stores display information, and implements a WYSIWYG (What You See I What You Get) function using the CRT 10. Further, on the basis of commands designated by a mouse cursor (not shown) on the CRT 10, the CPU 1 opens various windows that have been registered and executes a variety of data processing. When printing is executed, the user opens a window relating to printing settings, sets the printer and sets a printing processing method in regard to the printer driver, the setting including the selection of a printing mode.

The printer 1500 is controlled by a CPU 12. On the basis of a control program stored in a program ROM of a ROM 13 or a control program stored in an external memory 14, the printer CPU 12 outputs an image signal, which serves as output information, to a printing unit (printer engine) 17 connected to a system bus 15. A control program of the CPU 12 is stored in a program ROM of the ROM 13. Font data used when the above-mentioned output information is generated is stored in a font ROM of the ROM 13. In case of a printer not equipped with the external memory 14 such as a hard disk, information utilized in the host computer is stored in a data ROM of the ROM 13.

The CPU 12, which can execute processing for communicating with the host computer via an input unit 18, is capable of notifying the host computer 3000 of information internal to the printer 1500. A RAM 19, which functions as the main memory and work area of the CPU 12, is so adapted that memory capacity can be expanded by optional RAM connected to add-on memory, not shown. The RAM 19 is used as an expansion area for expanding output information and as a storage area for storing environment data. Further, the RAM is supplied with power continuously and therefore serves also as an NVRAM (non-volatile RAM). The external memory 14, such a hard disk (HD) or floppy disk, has its access controlled by a memory controller (MC) 20. The external memory 14, which is connected to the printer as an option, stores font data, an emulation program and form data, etc. Further, a control panel 1501 has an array of operation switches and LED indicators.

A plurality of the external memories 14 may be provided rather than just one. In such case, optional fonts to supplement the internal fonts would be stored in each external memory and so would programs for interpreting printer control languages of different language systems. Furthermore, the external memory 14 may have an NVRAM (not shown) for storing printer mode setting information from the control panel 1501.

Figure 2:
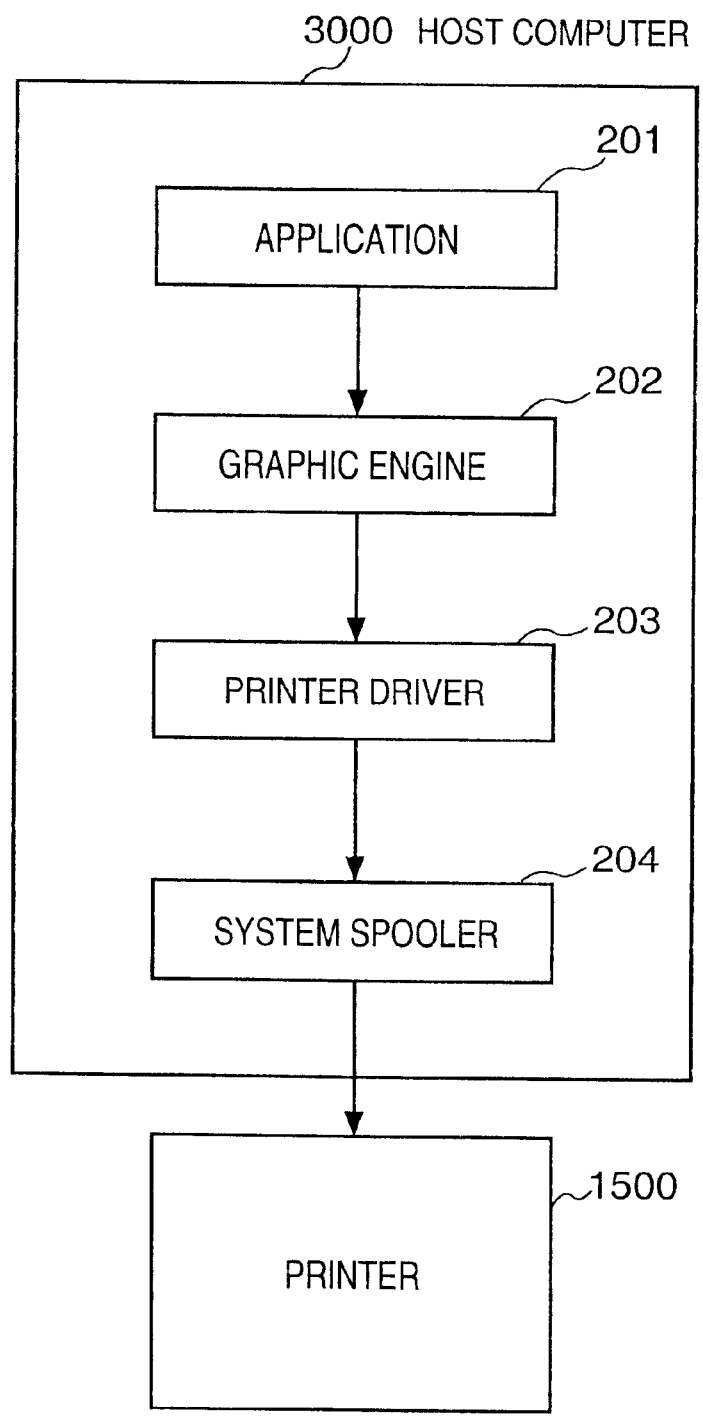
FIG. 2 is a diagram showing the generation of typical print data in a host computer.

FIG. 2 is a diagram showing typical printing processing executed by the host computer 3000 connected to a printing apparatus directly or via a network. An application 201, graphic engine 202, printer driver 203 and system spooler 204 are preserved in the external memory 11 as files. These are program modules which, when they are to be executed, are loaded in the RAM 2 and executed by the operating system and by modules which utilize these modules. The application 201 and the printer driver 203 can be stored on a floppy disk or CD-ROM of the external memory 11 or can be stored on the hard disk of the external memory 11 via a network, not shown. The application 201 preserved in the external memory 11 can be executed upon being loaded in the RAM 2. When the application 201 performs printing using the printer 1500, output (plotting) is performed utilizing the graphic engine 202 capable of being executed upon being loaded in the RAM 2. The graphic engine 202 loads the printer driver 203, which is prepared for each printing apparatus, from the external memory 11 to the RAM 2 and converts the output from the application 201 to printer control commands using the printer driver 203. The printer control commands obtained by the conversion are output to the printer 1500 via the interface 21 by way of the system spooler 204 that has been loaded into the RAM 2 by the operating system.

Figure 3:
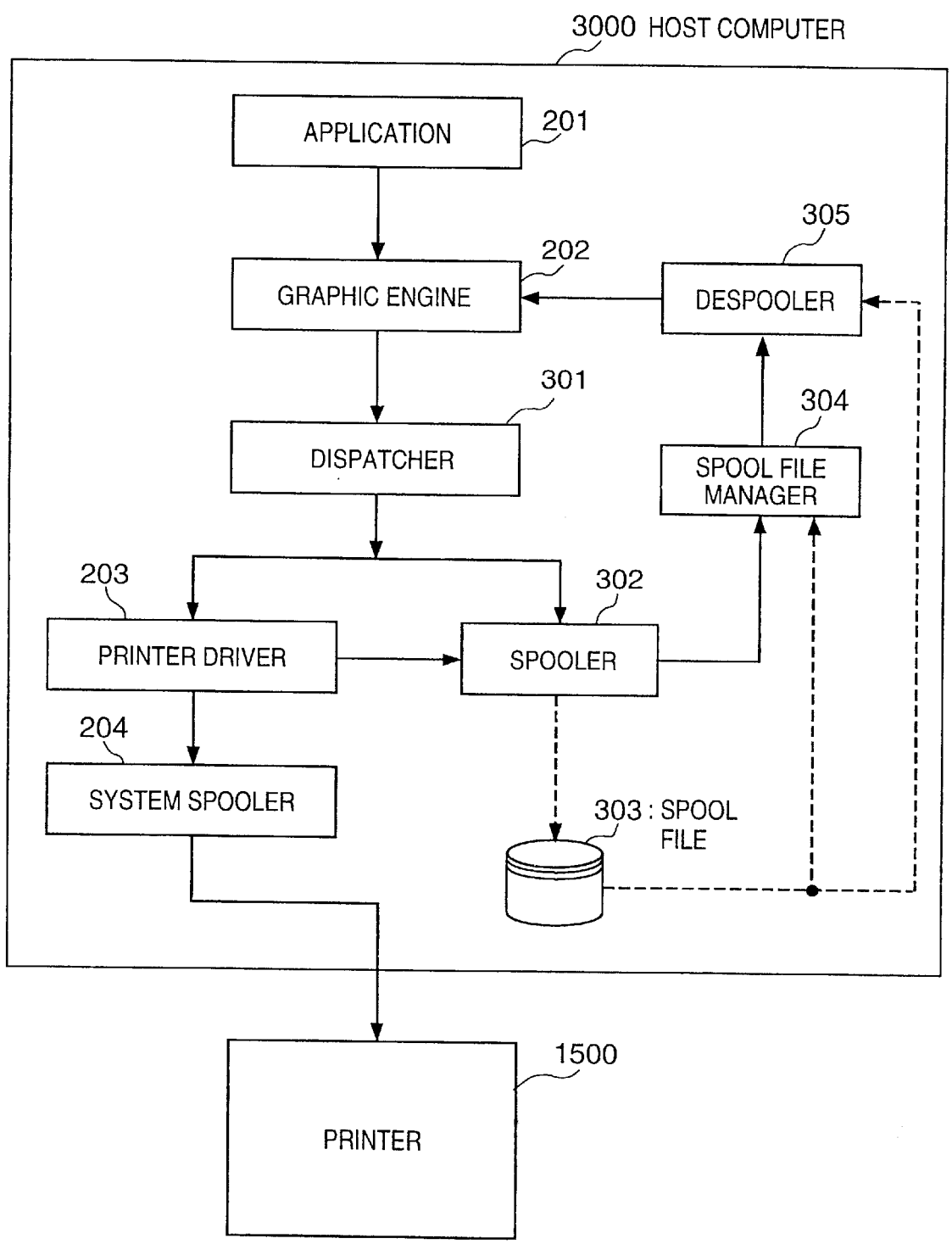
FIG. 3 is a diagram showing the generation of print data, which is an expansion of FIG. 2, for generating intermediate codes.

The printing system according to this embodiment has an arrangement which, as shown in FIG. 3, spools print data from the application temporarily by intermediate code data. This arrangement is provided in addition to the system comprising the printer 1500 and host computer 3000 shown in FIG. 2.

<Configuration of Printing Control System>

FIG. 3 is an expansion of the system of FIG. 2. Here a spool file 303 comprising intermediate codes is generated temporarily when a print instruction is sent from the graphic engine 202 to the printer driver 203. In the system of FIG. 2, the application 201 is freed from printing processing at the moment the printer driver 203 finishes converting all print instructions from the graphic engine 202 to printer control commands. In the system of FIG. 3, on the other hand, the application 201 is freed from printing processing at the moment a spooler 302 converts all print: instructions to intermediate code data and outputs the code data to a spool file 303. Ordinarily the latter requires a shorter period of time. Further, in the system shown in FIG. 3, the content of the spool file 303 can be manipulated. As a result, it is possible to realize functions not possessed by the application. For example, the print data from the application can be subjected to size enlargement and reduction so that a plurality of pages may be printed upon being reduced to the size of a single page.

In order to attain these objectives, the system of FIG. 2 is expanded in such a manner that print data is spooled in the form of intermediate codes as shown in FIG. 3. In order to manipulate the print data, the operator usually makes settings using a setting screen provided by the printer driver 203 and the printer driver 203 saves the set content in the RAM 2 or external memory 11.

The details of FIG. 3 will now be described. As illustrated in FIG. 3, the processing scheme thus expanded is such that print instructions from the graphic engine 202 are accepted by a dispatcher 301. In a case where a print instruction that the dispatcher 301 has accepted from the graphic engine 202 is a print instruction that the application 201 issued to the graphic engine 202, the dispatcher 301 loads the spooler 302, which has been stored in the external memory 11, into the RAM 2 and sends the print instruction to the spooler 302 and not the printer driver 203.

The spooler 302 converts the accepted print instruction to an intermediate code and outputs the code to a spool file 303. Further, the spooler 302 acquires the manipulation settings, which relate to print data set in the printer driver 203, from the printer driver 203 and preserves the data in the spool file 303. Though the spool file 303 is generated as a file in the external memory 11, the file may be generated in the RAM 2. Furthermore, the spooler 302 loads a spool file manager 304, which has been stored in the external memory 11, into the RAM 2 and notifies the spool file manager 304 of the status of spool file generation. In accordance with the content of the manipulation settings relating to the print data preserved in the spool file 303, the spool file manager 304 subsequently determines whether printing can be performed. When the spool file manager 304 has judged that printing can be performed utilizing the graphic engine 202, the spool file manager 304 loads a despooler 305, which has been stored in the external memory 11, into the RAM 2 and instructs the despooler 305 to perform printing of the intermediate codes described in the spool file 303.

In accordance with the content of manipulation settings included in the spool file 303, the despooler 305 manipulates the intermediate codes contained in the spool file 303 and outputs them again via the graphic engine 202.

In a case where a print instruction which the dispatcher 301 receives from the graphic engine 202 is a print instruction sent from the despooler 305 to the graphic engine 202, the dispatcher 301 sends the print instruction to the printer driver 203 and not the spooler 302.

The printer driver 203 generates a print control command in dependence upon the received print instruction and outputs the command to the printer 1500 via the system spooler 204 and bidirectional interface 21.

<Printer construction>

Figure 13:
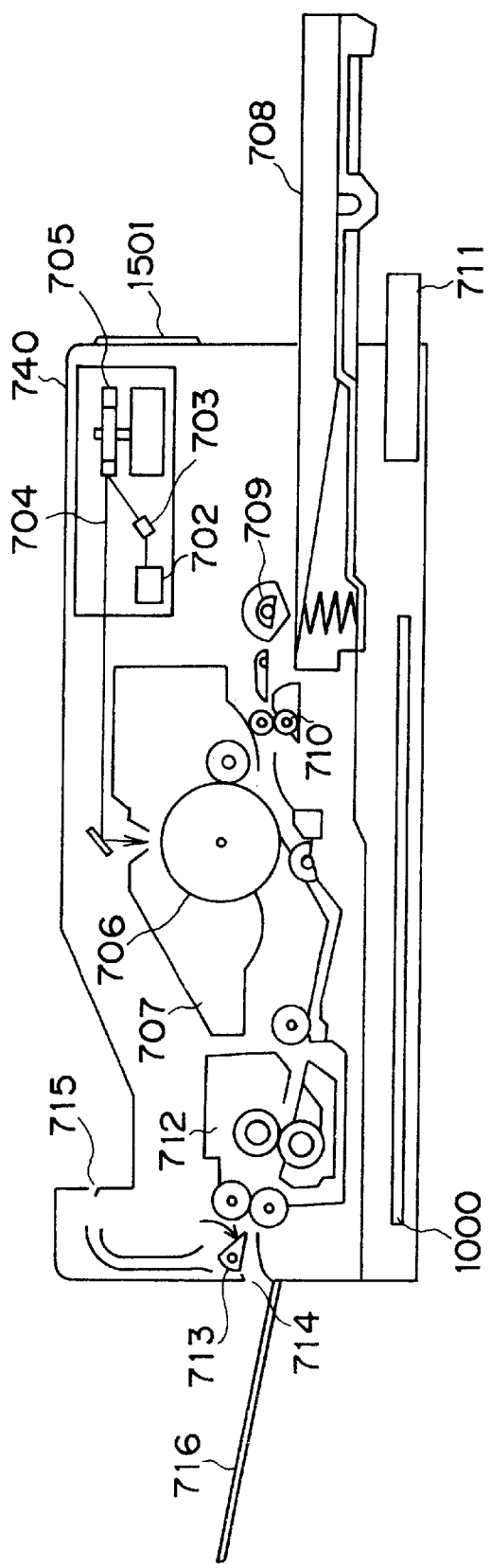
FIG. 13 is a sectional view of a Laser printer.

FIG. 13 is a sectional view showing an example of a printer used in this embodiment. FIG. 13 is a sectional view showing the internal structure of a laser printer. The laser printer receives an input of character pattern data and the like and prints on a printing medium such as recording paper.

A laser printer 740 in FIG. 13 forms an image on recording paper, which serves as the recording medium, based upon a printer control command and the like supplied thereto. The control panel 1501 has an array of operation switches and LED indicators. A printer control unit 1000 controls the overall laser printer 740 and analyzes character pattern information. The printer control unit 1000 primarily converts a printer control command to a video signal and outputs the video signal to a laser driver 702. An external memory 711, which supplied font data and an emulation program in page description language, can also be connected to the printer control unit 1000.

The laser driver 702, which is a circuit for driving a semiconductor laser 703, responds to the entered video signal by switching on and off a laser beam 704 emitted by the semiconductor laser 703. The laser beam 704 is swept back and forth by a rotating polygonal mirror 705 so as to be scanned across an electrostatic drum 706. As a result, an electrostatic latent image of a character pattern is formed on the electrostatic drum 706. The latent image is developed by a developing unit 707 surrounding the electrostatic drum 706, after which the developed image is transferred to the recording paper. Cut sheets are used as the recording paper and are held in a paper cassette 708 loaded in the laser printer 740. The cut sheets are fed into the apparatus by a feeding roller 709 and transport roller 710 so as to be supplied to the electrostatic drum 706. Recording paper can also be supplied from a manual insertion tray provided above the paper cassette 708.

The toner image that has been transferred to the recording paper is heated by a fixing unit 712 so that the toner is fixed to the recording paper. If a changeover wedge 713 is pointed upward, a sheet of recording paper on which an image has been formed is discharged, with its printed side facing upward, into a paper catch tray 716 from a face-up discharge section 714. If the changeover wedge 713 is pointed downward, the sheet of recording paper is discharged, with its printed side facing downward, from a face-down discharge section 715.

<Printing control procedure>

A control procedure followed when double-sided printing is carried out manually in the printing system of this embodiment will now be described in detail.

Figure 4:
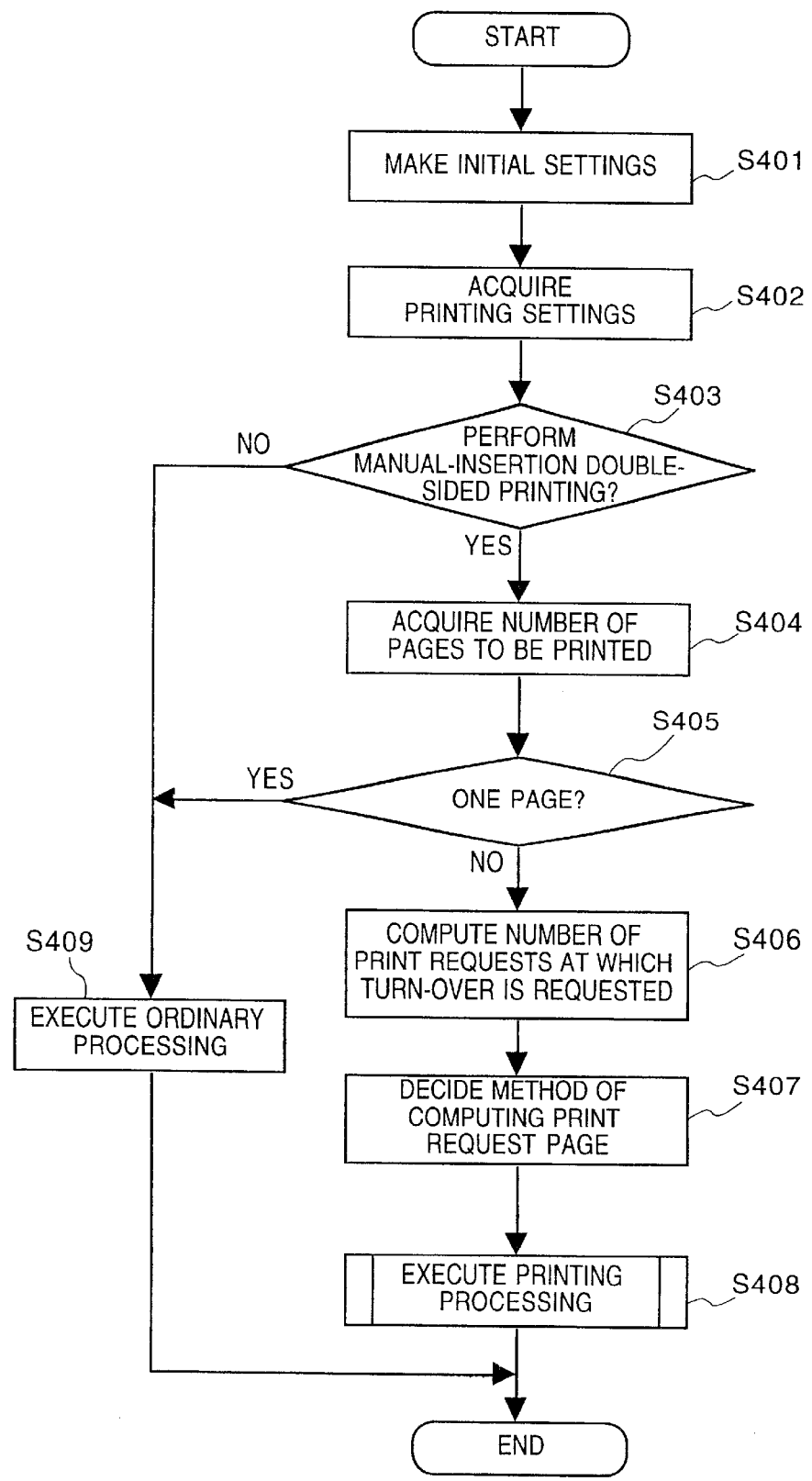
FIG. 4 is a flowchart of a printing control procedure according to the present invention.

FIG. 4 is a flowchart illustrating a procedure for outputting a print instruction from a spool file by means for the spool file manager 304. Here it will be assumed that print data from the application 201 has been stored in the spool file 303 as print instructions in logical page units via the graphic engine 202, dispatcher 301 and spooler 302. It should be noted that a logical page is a page-break unit in print data created by the application and then subjected to reduction or enlargement as necessary. By contrast, a physical page refers to one side of a sheet of recording paper printed on and output by the printer. One physical page is output by a single print request.

When the spool file manager 304 judges that an output is possible from the spool file 303, the spool file manager 304 executes the procedure shown in FIG. 4.

Initial settings required for printing are made at step 401 in FIG. 4.

The printing settings are acquired at step 402. The settings include type of paper feed and type of paper discharge as hardware characteristic information of the printer. This information is read from the printer 1500 via the bidirectional interface 21. The information is not read out by direct access to the printer from the spool file manager 304. The spool file manager 304 acquires the information, which has been read by the printer driver 203, from the printer driver 203. The printer shown in FIG. 13 is of the type in which paper feed is face-up while paper discharge is switched between face-up and face-down. The host is notified of the currently set state (face-up paper feed and the currently set type of paper discharge) at step 402.

This is followed by step 403, at which it is determined whether double-sided printing by manual insertion is to be carried out. If the decision is "YES", control proceeds to step 404. If the decision is "NO", then control proceeds to step 409, at which ordinary printing processing is executed. Specifically, the print data is read out and printed in the order of the logical pages or in an order that has been specified.

The number of logical pages of print data from the application is acquired at step 404.

It is determined at step 405 whether the number of logical pages acquired at step 404 is one page. If the answer is "YES", control proceeds to step 409 because double-sided printing is not required. If the answer is "NO", then control proceeds to step 406.

A request to turn over recording paper that has been printed on must be sent to the operator. The particular timing, in terms of the number of print requests sent to the printer, at which this turn-over request should be issued is computed at step 406. More specifically, in order for double-sided printing to be performed by a printer for single-sided printing, the sheets of recording paper on which printing has already been performed on one side must be placed in the paper supply tray again in such a manner that printing may be performed on the other side. The particular page number, in terms of physical pages, that corresponds to the timing at which the recording paper is to be reset in the paper supply tray is computed. That is, what is computed is how many sheets of paper must be output before the paper is placed in the supply tray again. Upon receiving the turn-over request, the operator removes the paper from the catch tray and places the paper in the supply tray in the specified orientation.

Figure 9:
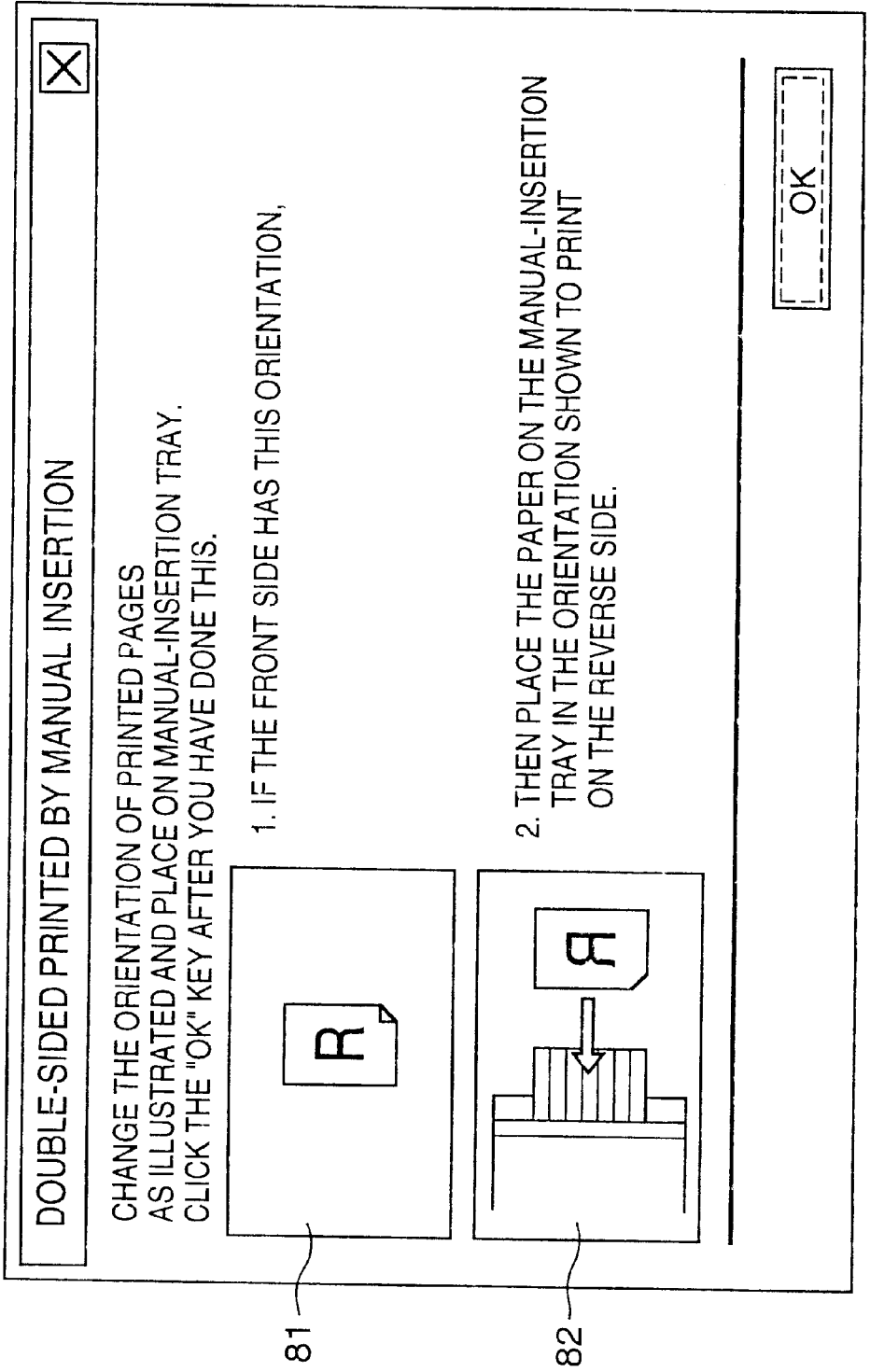
FIG. 9 is a diagram showing an example of a dialog screen requesting a user to turn over a page.

In this embodiment, an appropriate image is selected from a total of 32 images indicating 32 ways to turn over recording paper shown in FIGS. 7A through 7P and FIGS. 8A through 8P, and the selected image is displayed as turn-over request dialog shown in FIG. 9. This display serves as operator instructions for paper turn-over. The total of 32 images is illustrated in FIGS. 7A through 7P and FIGS. 8A through 8P. One image to be displayed in the dialog window is selected from these images in dependence upon a combination of four factors: (1) whether the printing format is landscape or portrait (two possibilities); (2) the orientation of the paper in regard to the paper supply port (four possibilities); (3) whether a paper supply tray or cassette is used (two possibilities) and (4) whether the front side or reverse side is faced upward (two possibilities). The procedure through which the image to be displayed is selected from the images of FIGS. 7A through 7P and FIGS. 8A through 8P will be described later.

The method of computing the printing sequence of logical pages is decided at step 407 based upon the type of paper feed and type of paper discharge of the printer, these having been acquired at step 402. In regard to printing, first single-sided printing is performed of odd-numbered or even-numbered pages, the printed pages are turned over and then the remaining pages are printed. The printing sequence varies depending upon the combination of two types of paper feed (face-up/face-down) and two types of paper discharge (face-up/face-down) into the catch tray. Consequently, there are four methods of computation, one of which is selected depending upon the state of the printer used. The combinations and the corresponding computation methods are as shown in FIG. 5. Specifically, these are: face-up feed/face-up discharge (computation type 1); face-up feed/face-down discharge (computation type 2); face-down feed/face-up discharge (computation type 3); and face-down feed/face-down discharge (computation type 4). The details of the computation methods will be described later.

Manual-insertion doubled-sided printing processing is executed at step 408, the details of which will be described with reference to FIG. 6.

Figure 6:
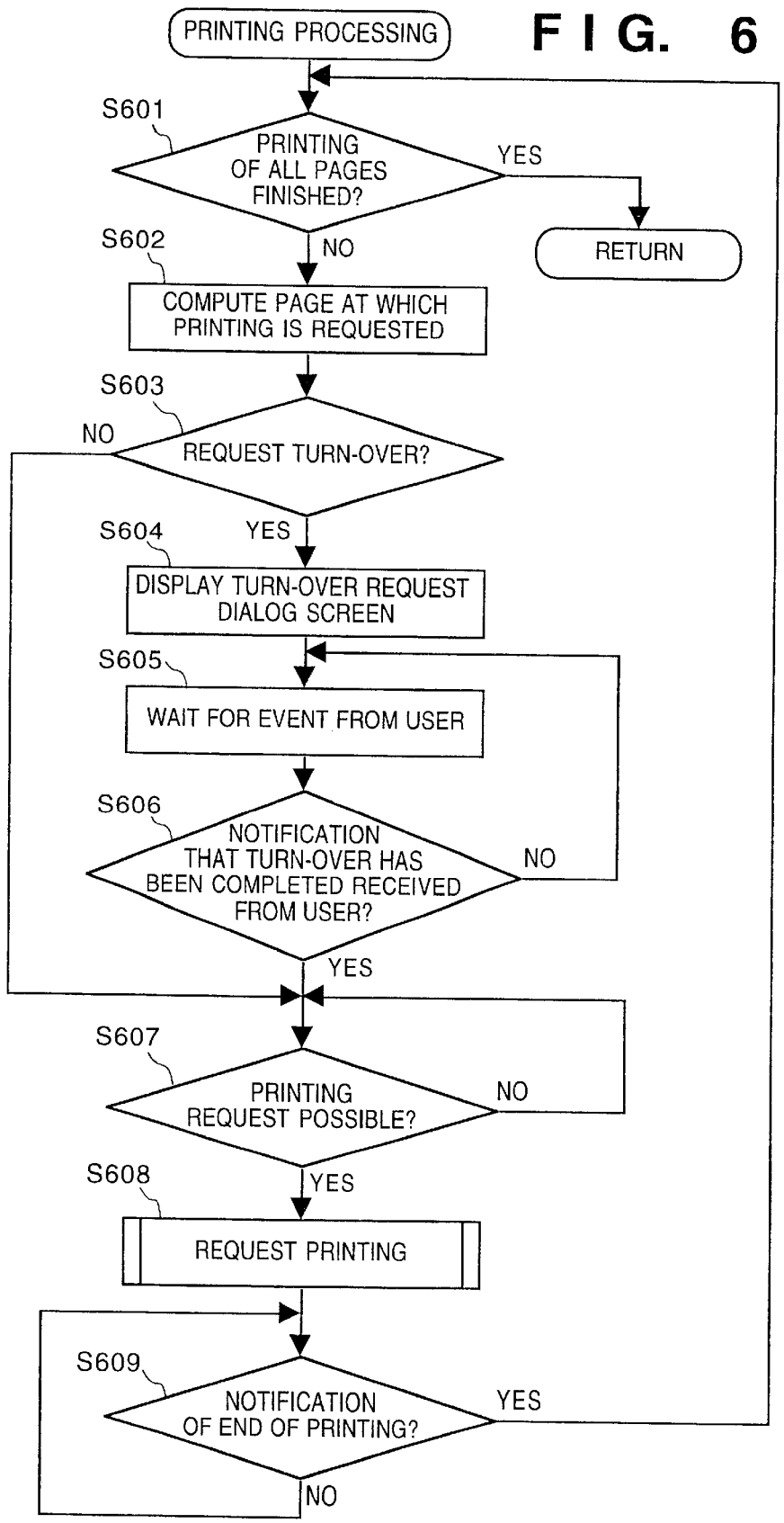
FIG. 6 is a flowchart of printing processing, which is one step in FIG. 4.

FIG. 6 shows the details of processing in a case where manual-insertion double-sided printing is performed.

It is determined at step 601 whether printing of all print data from the application has been completed. Processing is terminated if the decision is "YES" but proceeds to step S602 if the decision is "NO".

In accordance with the computation method set at step 407 in FIG. 4, the logical page number at which a print request is issued is computed at step 602. The order of the physical page numbers for which printing is requested depends upon the type of computation method and is as follows in a case where there are six pages of print data in terms of physical pages:

(1) For computation type 1, printing is requested in the following order: 6, 4, 2, (turn-over request), 5, 3, 1.

(2) For computation type 2, printing is requested in the following order: 6, 4, 2, (turn-over request), 1, 3, 5.

(3) For computation type 3, printing is requested in the following order: 2, 4, 6, (turn-over request), 5, 3, 1.

(4) For computation type 4, printing is requested in the following order: 2, 4, 6, (turn-over request), 1, 3, 5.

Thus, pages for which printing is request is decided at step 602 in such a manner that the physical pages will be output in the order that conforms to the type of computation.

In a case where the printing of one logical page is performed per one physical page, the page number that the despooler 305 is requested to print first with regard to each type of computation is as illustrated in FIG. 11.

In a case where the printing of N logical pages is performed per one physical page, the page number that the despooler 305 is requested to print first with regard to each type of computation is as illustrated in FIG. 12.

In regard to computation types 1 and 2 in FIG. 12, it is stated that a blank page should be output in a case where blank-page criteria are satisfied. The blank-page criteria are as follows:

In a case where N logical pages are consolidated as a single physical page, a Pth logical page is included in a (P/N)th physical page (where the operation "X/Y" represents a value obtained by dividing X by Y and rounding up fractions). The (P/N) th physical page includes logical pages from a $(((P/N)-1) \times N+1)$th logical page to a $[(P/N) \times N]$th logical page (or final page)]. Accordingly, if the Pth logical page is the final page, then the fact that the physical page number P/N in which this page is included is odd-numbered is the criterion for deciding that the initial physical page is a blank page in computation type 1 or 2. If the blank-page criteria are satisfied., a blank-page flag is turned ON.

Further, if the blank-page criteria is not satisfied in case of computation type 1 or 2, then it is requested that the physical page printed first be a physical page obtained by consolidating logical pages from the $(((P/N)-1) \times N+1)$th logical page to the Pth logical page (or final logical page).

Further, the printed logical page number shown in FIG. 12 is the largest logical page number included in a physical page for which a printing request is to be issued. A physical page printed with respect to this page for which printing is requested includes logical pages from a [(print request page number)–N+1]th logical page to a print request page number) logical page. From the second physical page onward, computation is performed through the procedure set forth below. It should be noted that in a case where one logical page is printed for one physical page, it will suffice to apply 1 as the value of N. If N=1 is adopted, the content of FIG. 12 will be the same as that of FIG. 11.

A method of computing logical page numbers for which printing is requested from the second physical page onward is as set forth below. The print request page number sought is the largest logical page number included in a physical page for which a printing request is to be issued. There are instances where this print request page is larger than the final print gate printed. Such a logical page is not printed.

It should be noted that fractions below the decimal point resulting from division are rounded up unless stated otherwise. Further, the number F of physical pages necessary for a number L of logical pages to be printed is F=L/N. For example, if printing is performed in such a manner that a document having a total of 13 pages is grouped four pages at a time to construct one physical page, we have F=13/4 =4. In the description that follows, a page number for which printing is requested will be represented by NEXTP. NEXTP on the left side is the page number for which printing is to be newly requested, and NEXTP on the right side is the page number for which printing was requested immediately before.

(1) In case of computation type 1

NEXTP←(NEXTP/N−2)×N

If the above expression results in a value less than zero, then calculation is performed again in accordance with the following:

If F is an odd number:

NEXTP←F×N

If F is an even number:

NEXTP←(F−1)×N (2) In case of computation type 2

If a physical page that was requested for printing immediately before is odd-numbered:

NEXTP←NEXTP+2 ×N

If a physical page that was requested for printing immediately before is even-numbered:

NEXTP←NEXTP−2 ×N

If the above expressions result in values equal to zero, then calculation is performed again in accordance with the following:

NEXTP←N (3) In case of computation type 3

If a physical page that was requested for printing immediately before is odd-numbered:

NEXTP←NEXTP−2×N

If a physical page that was requested for printing immediately before is even-numbered:

NEXTP←NEXTP+2×N

When computed NEXTP is greater than F×N:

If F is an odd number:

NEXTP←F×N

If F is an even number:

NEXTP←(F−1)×N (4) In case of computation type 4

NEXTP←NEXTP +2×N

When computed NEXTP is greater than F×N:

NEXTP←N

The number of a page for which printing is requested is thus calculated at step 602 in accordance with (1) through (4) above.

This is followed by step 603, at which it is determined whether the number of print requests to be issued from now on agrees with the number of print requests up to issuance of a turn-over request, this number having been calculated at step 406 in FIG. 4. If the two agree, control proceeds to step 604; otherwise, control jumps to step 607.

The turn-over request dialog screen is displayed for viewing by the operator at step 604. FIGS. 7A through 7P and FIGS. 8A through 8P illustrate examples of what is displayed on the dialog screen.

Next, at step 605, the apparatus waits for an event from the user signifying that preparations for feeding paper have been completed.

It is determined at step 606 whether an event from the user signifying that preparations for feeding paper have been completed has occurred. If the completion event has occurred, control proceeds to step 607; otherwise, control returns to step 605.

If the event notifying of the fact that the user has completed the preparations for refeeding the paper is received, then it is determined at step 607 whether it is possible to request the printer to print. If it is possible, control proceeds to step S608; otherwise, the apparatus waits until it is possible.

A print request is sent to the despooler 305 at step 608 in regard to print data having the physical page number calculated at step 602.

Figure 10:
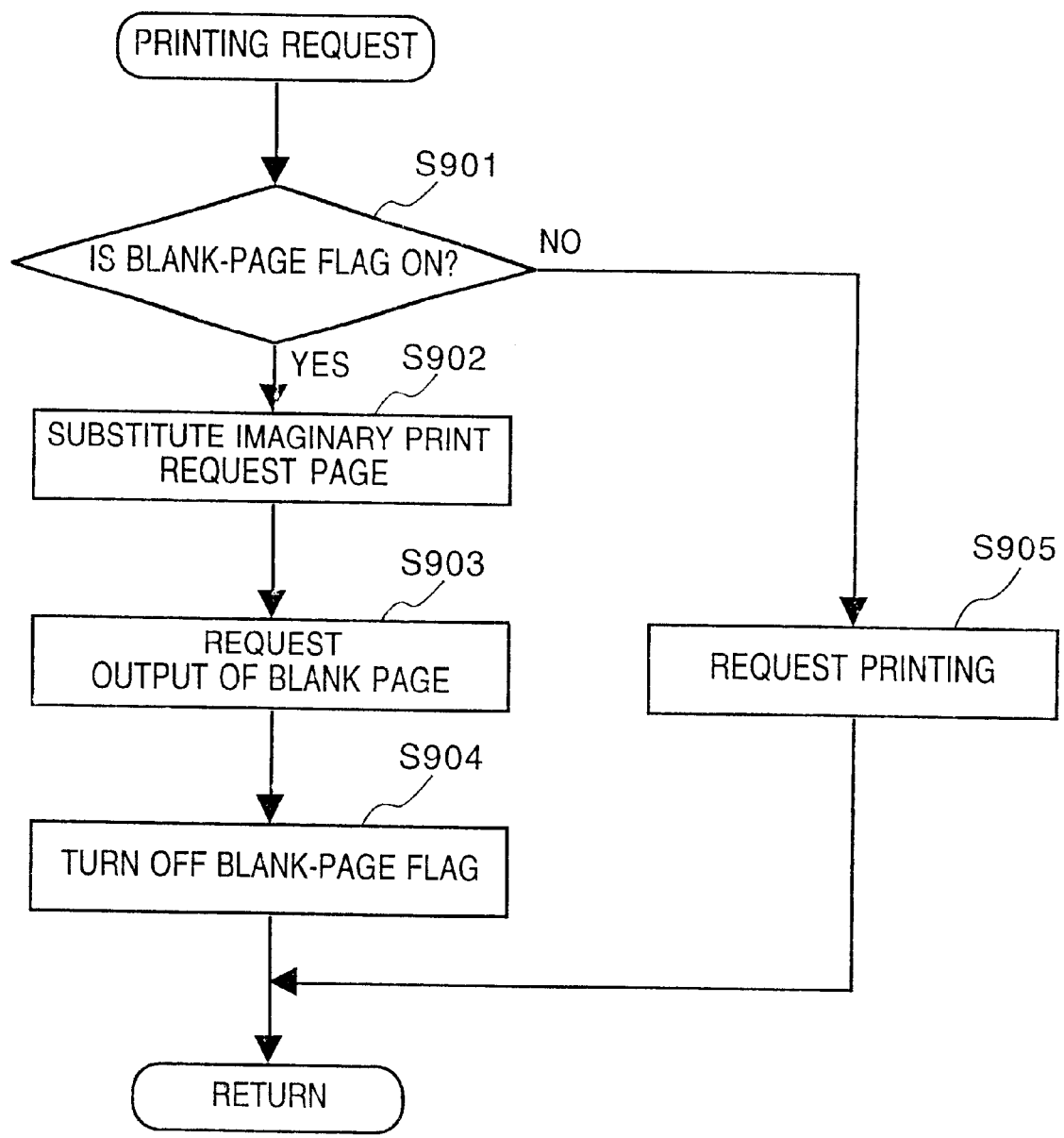
FIG. 10 is a flowchart of processing for printing a blank page.

FIG. 10 is a flowchart useful in describing the print request processing of step 608, which includes blank-page processing.

If the blank-page flag is found to be ON at step 901, control proceeds to step 902. If the flag is found to be OFF, control proceeds to step 905.

Step 902 calls for calculation of an imaginary print request page for the sake of calculating the next print request page. Here a blank page is regarded as being one printed on the reverse side of the final physical page in a case where the number of physical pages is odd.

A request for outputting a blank page is issued at step 903. This is followed by step 904, at which the blank-page flag is turned OFF since issuance of the request for output of the blank page has been completed. Next, at step 905, a request for output of the page calculated at step 602 is issued at step 905. Thus, the print data is printed, inclusive of the blank page.

It is determined at step 609 whether notification of end of printing has been received from the despooler 305. If the answer is "YES", control proceeds to step 601. If the answer is "NO", the apparatus waits until notification of end of printing is received.

Double-sided printing by manual insertion is implemented by the procedure described above.

<Display of turn-over request>

Reference will be had to the drawings from FIG. 14 onward to describe an algorithm implemented at step 604 for displaying appropriate page turn-over illustrations.

In this embodiment, an appropriate display is selected and displayed based upon the following five settings:

1. Paper (portrait/landscape)
2. Method of paper feed (tray/cassette)
3. Printing side (upward/downward)
4. Direction of paper feed (long/short edge)
5. Position of binding margin (long/short edge binding)

Figure 14B:
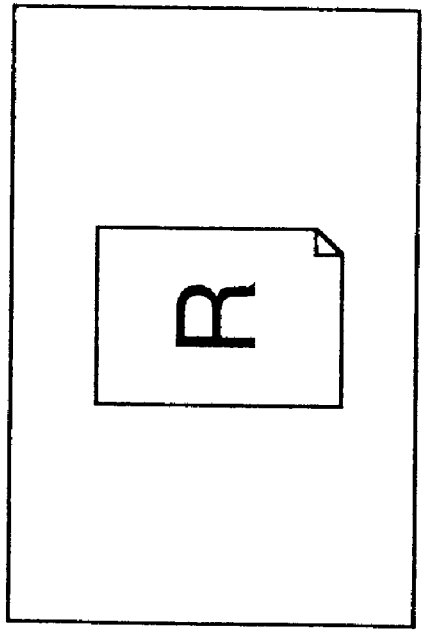
FIGS. 14A and 14B are diagrams showing a display of vertically (portrait) oriented paper and a display of horizontally (landscape) oriented paper, respectively.
Figure 14A:
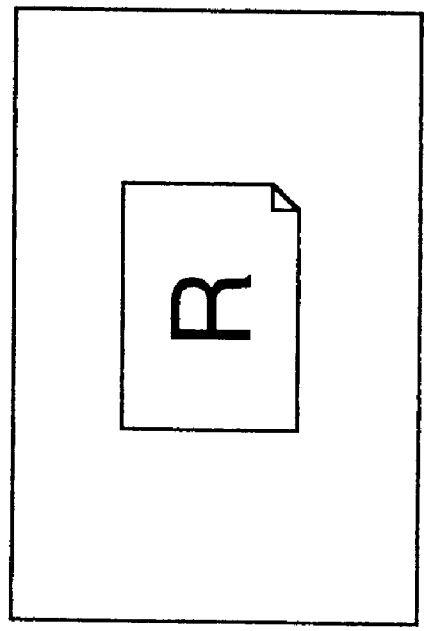

First, the paper orientation is decided by the setting of Item 1. In the case of the portrait orientation, a sheet of paper is displayed vertically, as shown in FIG. 14A. In the case of the landscape orientation, a sheet of paper is displayed horizontally, as shown in FIG. 14B.

Figure 15A:
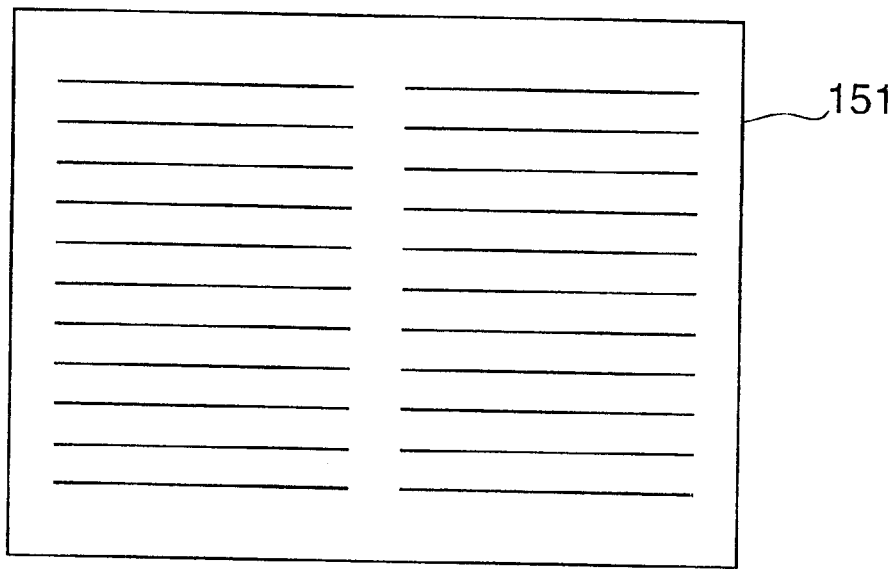
FIGS. 15A and 15B are diagrams showing 2-UP and 8-UP layouts, respectively.
Figure 15B:
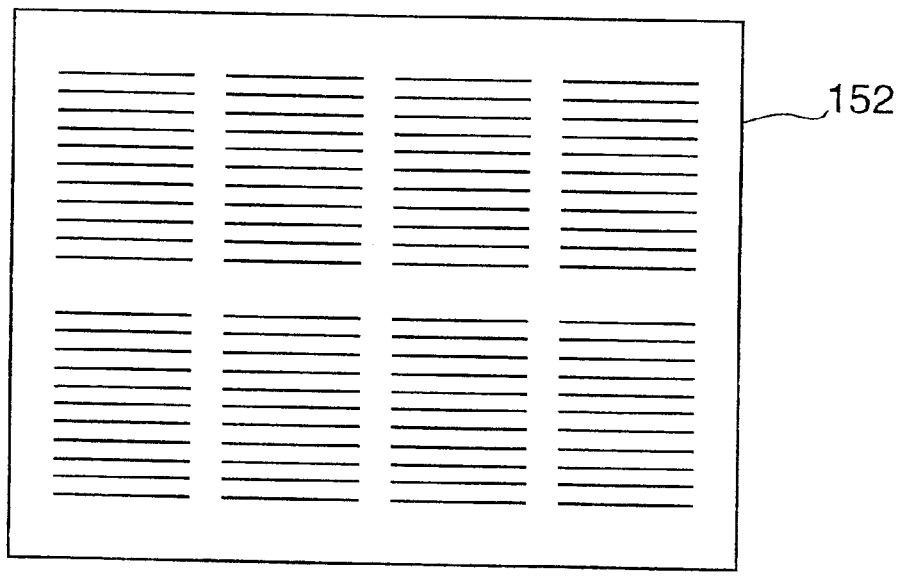

In a case where N logical pages are output upon being reduced and laid out as one physical page, there are instances where the paper orientation of the logical pages is changed to a different paper orientation on the physical page depending upon the reduction and layout. For example, in a case where two logical pages are reduced and laid out on one physical page 151, as shown in FIG. 15A, or in a case where eight logical pages are reduced and laid out on one physical page 152, as shown in FIG. 15B, changing the paper orientation of the logical page makes possible a layout which reduces blank areas on the paper. In the cases of FIGS. 15A and 15B, therefore, it is necessary to change the paper orientation of the logical pages.

Figure 16:
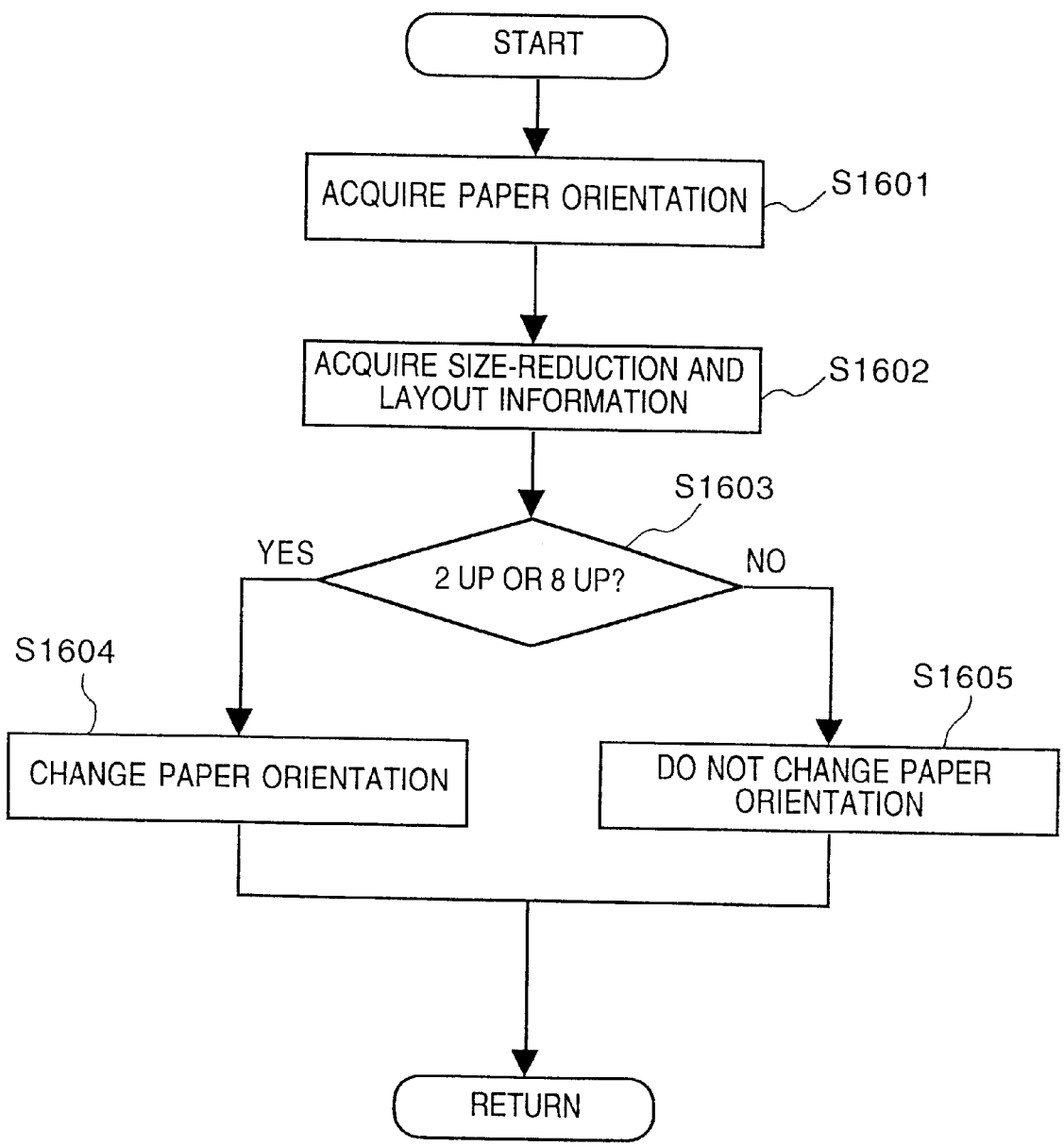
FIG. 16 is a flowchart showing processing for deciding paper orientation.

FIG. 16 is a flowchart illustrating the flow of processing for deciding paper orientation.

In this embodiment, paper orientation will be changed for laying out two pages on one physical page (this layout shall be referred to as "2 UP" below) and eight pages on one physical page (this layout shall be referred to as "8 UP" below).

Paper orientation set for printing is acquired at step 1601 in FIG. 16. This is followed by step 1602, at which a setting indicating how may logical pages are to be reduced and laid out on one physical page is read in.

It is determined at step 103 whether the setting read in at step 1602 is either of 2 UP or 8 UP. If the answer is "YES", control proceeds to step 1604, at which the orientation of the paper is changed. If the answer is "NO", on the other hand, control proceeds to step 1605, which the no change in paper orientation is made.

If the paper orientation acquired at step 1601 is the portrait orientation, it is decided at step 1604 that the paper orientation displayed on the dialog screen should be the landscape orientation. If the paper orientation acquired at step 1601 is the landscape orientation, it is decided at step 1604 that the paper orientation displayed on the dialog screen should be the portrait orientation.

If the paper orientation acquired at step 1601 is the portrait orientation, it is decided at step 1605 that the paper orientation displayed on the dialog screen should be the portrait orientation. If the paper orientation acquired at step 1601 is the landscape orientation, it is decided at step 1604 that the paper orientation displayed on the dialog screen should be the landscape orientation.

The paper orientation displayed on the dialog screen is thus decided. On the basis of paper orientation obtained by the processing of FIG. 16, the image of the paper is displayed on a dialog display screen indicating a sheet of paper the front side of which has been printed on, as shown in the display field 81 in FIG. 9. More specifically, if the original paper orientation is the portrait orientation and the logical page has been rotated 90° for the 2 UP or 8 UP layout, the display presented is as shown in FIG. 14B. If the original paper orientation is the landscape orientation and the logical page has been rotated 90° for the 2 UP or 8 UP layout, the display presented is as shown in FIG. 14A.

If the paper orientation has been decided, then information indicating which paper supply port is to be used is read out of the printer hardware characteristic information acquired at step 402 and the type of supply port to be displayed in decided. The corresponds to Item 2 mentioned above.

In this embodiment, manual-insertion double-sided printing is possible using two paper supply ports, namely one corresponding to a paper-insertion tray and one corresponding to a cassette. An image depicting a cassette is used if the setting is for paper feed from the cassette, and an image depicting a tray is used if the setting for paper feed from the manual-insertion tray.

Figure 17A:
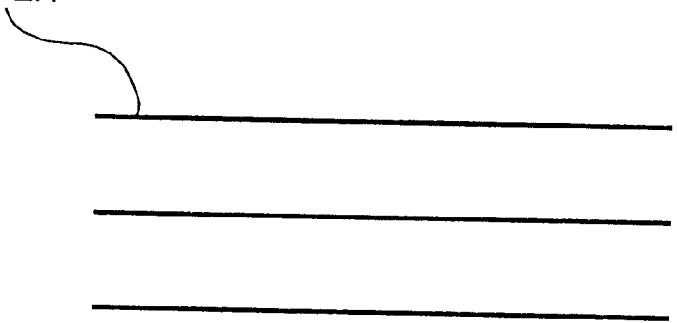
FIGS. 17A and 17B are diagrams useful in describing face up and face down.
Figure 17B:
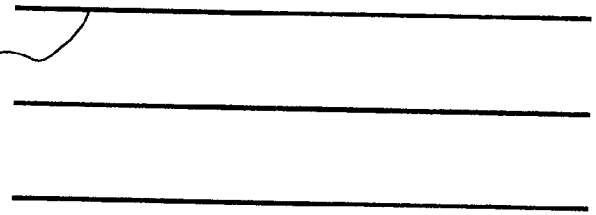

As for Item 3 above, information indicating the characteristic of the paper supply port is read out of the printer hardware characteristic information acquired at step 402 and it is decided which side of the paper, the front side of which has been printed on, should be faced upward (or downward) when the paper is inserted into the paper supply port. When the paper feed side is the front side (face up), this signifies a paper-feed characteristic indicating that printing is performed on the top side of stacked sheets of paper, as shown in FIG. 17A. When the paper feed side is the reverse side (face down), this signifies a paper-feed characteristic indicating that printing is performed on the back side of stacked sheets of paper, as shown in FIG. 17B.

If the acquired characteristic of the paper supply port is face up, then it is required that the paper be inserted with the reverse side facing upward. Accordingly, a display indicating the reverse side of the paper is selected. If the acquired characteristic of the paper supply port is face down, then it is required that the paper be inserted with the reverse side facing downward. Accordingly, a display indicating the front side of the paper is selected.

As for Item 4 above, information indicating the characteristic of the paper supply port is read out of the printer hardware characteristic information acquired at step 402 and whether a long edge of specified paper or a short edge of the specified paper is to be inserted into the paper supply port is acquired. Depending upon the printer, there are cases where the long edge and short edge are changed in accordance with the side of the paper to be printed on. For example, printers exist in which if it is possible to feed paper of size A3, then size A3 paper is inserted from a short edge and paper of size A4 is inserted from a long edge.

The content displayed on the dialog screen for resetting the paper is classified as shown in the table of FIG. 18 in conformity with the settings of Items 1 through 4 above.

Finally, information indicating the orientation in which the image should be formed with respect to the side inserted into the paper supply port is obtained from the printer hardware characteristic information acquired at step 402. Furthermore, the binding margin setting is obtained as Item 5 from the acquired printing settings and a decision is made as to the direction (top, bottom, left or right) from which insertion is necessary in regard to the image that has been printed on the from: side. As shown in FIGS. 19A through 19H, binding methods dealt with here are of two types, namely binding along a long edge (FIGS. 19E through 19H) and binding along a short edge (FIGS. 19A through 19D). These binding methods are used in regard to both the portrait and landscape printing orientations.

Orientations in which an image is formed with respect to paper feed direction may be any of the eight orientations shown in FIGS. 20A through 20H.

More specifically, in the case of long-edge paper feed (in which a long edge is faced toward the paper supply port), the following four combinations are possible as orientations of the image to be formed:

(1) The edge of the paper faced toward the paper supply port is made the top edge if the paper is in the landscape orientation and the right edge if the paper is in the portrait orientation (FIG. 20A).

(2) The edge of the paper faced toward the paper supply port is made the top edge if the paper is in the landscape orientation and the left edge if the paper is in the portrait orientation (FIG. 20C).

(3) The edge of the paper faced toward the paper supply port is made the bottom edge if the paper is in the landscape orientation and the left edge if the paper is in the portrait orientation (FIG. 20E).

(4) The edge of the paper faced toward the paper supply port is made the bottom edge if the paper is in the landscape orientation and the right edge if the paper is in the portrait orientation (FIG. 20G).

In the case of short-edge paper feed (in which the short edge is faced toward the paper supply port) the following four combinations are possible as orientations of the image to be formed:

(5) The edge of the paper faced toward the paper supply port is made the left edge if the paper is in the landscape orientation and the top edge if the paper is in the portrait orientation (FIG. 20D).

(6) The edge of the paper faced toward the paper supply port is made the right edge if the paper is in the landscape orientation and the top edge if the paper is in the portrait orientation (FIG. 20C).

(7) The edge of the paper faced toward the paper supply port is made the left edge if the paper is in the landscape orientation and the bottom edge if the paper is in the portrait orientation (FIG. 20F).

(8) The edge of the paper faced toward the paper supply port is made the right edge if the paper is in the landscape orientation and the bottom edge if the paper is in the portrait orientation (FIG. 20H).

Thus, depending upon the characteristic of the printer used, the edge faced toward the paper supply port is any of the following four types when printing has been performed: top/left (FIGS. 20C, 20D); top/right (FIGS. 20A, 20B); bottom/left (FIGS. 20E, 20F); and bottom/right (FIGS. 20G, 20H).

In case of double-sided printing by manual insertion, printing is performed on the reverse side in accordance with the above-mentioned characteristic. The content of the display presented at step 604 in FIG. 6, therefore, is decided taking into account this characteristic and the setting of the binding margin.

FIGS. 21A through 21D are diagrams showing the relationship between binding margin and paper orientation in a case where printing is performed on both sides of the paper.

Figure 21A:
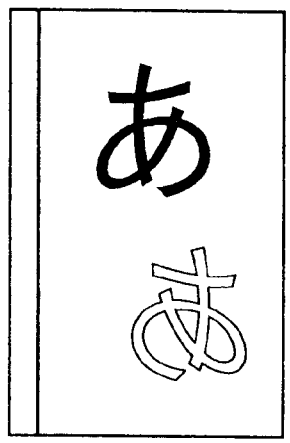
FIGS. 21A through 21D are diagrams showing the positional relationship between binding margin and front and reverse sides of paper.

If vertically oriented paper is bound along a long edge, the vertical orientation of print on the front side is no different from that on the reverse side (FIG. 21A).

Figure 21B:
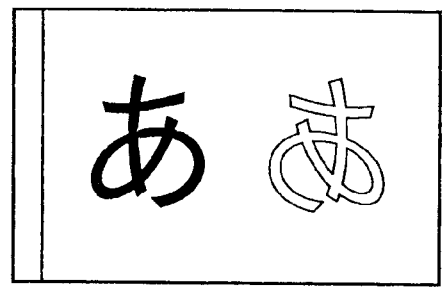
Figure 21C:
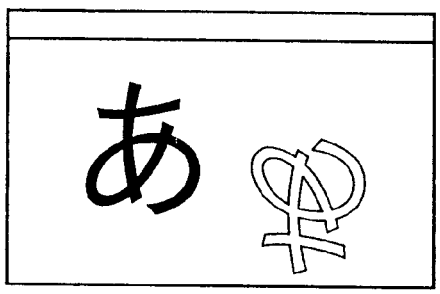
Figure 21D:
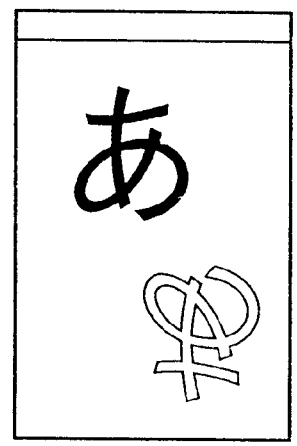

If vertically oriented paper is bound along a short edge, the vertical orientation of print on the front side is different from that on the reverse side (FIG. 21D).

If horizontally oriented paper is bound along a long edge, the vertical orientation of print on the front side is different from that on the reverse side (FIG. 21C).

If horizontally oriented paper is bound along a short edge, the vertical orientation of print on the front side is no different from that on the reverse side (FIG. 21B).

Whether a sheet of paper the reverse side of which is to undergo printing should be inserted from the top, bottom, left or right edge is decided depending upon the combination of FIGS. 20A through 20H and FIGS. 21A through 21D. In other words, the binding margin information described with reference to FIGS. 21A through 21D is combined with the information of FIGS. 20A through 20H indicating how the image should be oriented with respect to the paper supply port and, on the basis of this combination, it is decided to orient the paper as shown in FIGS. 20A through 20H or to rotate the paper by 180° with respect thereto.

For example, if the paper orientation is the portrait orientation, the paper is supplied by cassette, the paper is fed with the front side faced downward and the paper is fed with its long edge faced toward the paper supply port, then the candidates for the image displayed on the dialog screen are the two shown in row 181 of FIG. 18. In this case the orientation of the image with respect to the paper feed orientation is either that of image 20A1 in FIG. 20A or that of image 20C1 in FIG. 20C, depending upon the characteristic of the printer. If the paper is to be bound along a short edge, then printing must be performed as shown in FIG. 21D. If the paper is to be bound along a long edge, on the other hand, then printing must be performed as shown in FIG. 21A. Accordingly, in order to instruct the operator of the paper orientation when the paper is to be fed through the apparatus again, the content displayed in a field 82 in FIG. 9 is decided as follows with respect to a sheet of paper the front side of which has been printed on in the manner shown in field 81: If, in a case where the printer is of the type shown in FIG. 20C, binding is to be performed along a short edge, then the right side (i.e., FIG. 8P) of row 181 in FIG. 18 is decided upon in order to perform printing as shown in FIG. 21D. If binding is to be performed along a long edge, then the left side (i.e., FIG. 8N) of row 181 in FIG. 18 is decided upon in order to perform printing as shown in FIG. 21A. In a case where the printer is of the type shown in FIG. 20A, the opposite of the above holds. If the content of field 81 in FIG. 19 is such that the paper orientation is vertical, this corresponds to FIG. 14A. If the content of field 81 is such that the paper orientation is horizontal, this corresponds to FIG. 14B.

Thus image displayed on the dialog screen is decided as set forth above. Whether image A or image B in FIG. 18 is selected is decided by the printer characteristic and the binding method, as described in connection with FIGS. 20 and 21. A more general description of the selection method is as illustrated in FIGS. 22A and 22B. FIG. 22A illustrates the method of selection when use is made of a printer in which paper feed is face-up, FIG. 22B illustrates the method of selection when use is made of a printer in which paper feed is face-down. Whether the paper supply port is that for a tray or cassette is irrelevant in FIGS. 22A, 22B.

The dialog screen thus decided is displayed at step 604 in FIG. 6. This display may be presented by the host computer 3000 or by the printing apparatus or by both.

As a result of the foregoing processing, the display of the illustration in double-sided printing by manual insertion is presented in proper fashion. If the operator sets the paper in the manner instructed by the display, the desired results of printing can be obtained.

Though a laser printer is used in the foregoing embodiment, the present invention can be applied to any printing technique.

The processing for deciding the illustration of manual-insertion double-sided printing described in the foregoing embodiment is assumed to be executed by the spool file manager 304 in FIG. 3. However, the processing can be executed by the printer driver 203 or divided between the spool file manager 304 and the printer driver 203.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, the present invention covers a case where an operating system or the like working on the computer performs a part of or the entire process in accordance with the designation of program codes and implements the functions according to the embodiment.

The present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, in accordance with the present invention, as described above, it is possible for the operator to receive, from the printing apparatus, instructions on how to perform printing of any appearance or format. As a result, it is no longer necessary for the operator to adjust the order of printing by taking into account the type of paper feed and type of paper discharge, to perform test printing or to decide the orientation in which paper should be set to perform printing properly on the reverse side. This makes it possible to realize double-sided printing in simple fashion.

The present invention is not limited to the above embodiments and various changes and modifications can be made within the spirit and scope of the present invention. Therefore, to apprise the public of the scope of the present invention, the following claims are made.

What is claimed is:

1. A printing control apparatus that generates print data to be printed by a printing apparatus that prints on a first side of a printing medium and that prints on a second side of the printing medium after re-feeding by an operator, said printing control apparatus comprising:

setting input means for entering a printing setting;

printing request means for deciding, based on characteristic information of the printing apparatus, a page order in which the printing apparatus is to be made to output pages to perform printing on both sides of the printing medium, and for causing the printing apparatus to perform printing in the decided order; and display control means for, in a case where a number of pages printed by said printing request means has reached half a total number of pages to be printed, controlling a graphical display to indicate how the operator should re-feed the printing medium, of which the printing apparatus has printed on one side, to the printing apparatus, based upon the printing setting entered by said setting input means.

2. The apparatus according to claim 1, wherein
the printing setting includes a reduction and layout setting for reducing a size of a plurality of pages and for printing pages of reduced size on one side of the printing medium, and,
if a reduction and layout setting has been set, said printing request means reduces each page to create new pages and, based on a number of the new pages, decides a page order in which the new pages are to be output.

3. The apparatus according to claim 1, wherein
the printing setting includes information relating to an orientation at which an image is formed on the printing medium and a position of a binding margin of the printing medium, and
said display control means decides and specifies an orientation at which the printing medium should be re-fed based upon an orientation at which the printing medium was originally fed, the orientation at which the image is formed on the printing medium, and the position of the binding margin.

4. The apparatus according to claim 3, wherein, if an orientation of an image with respect to the printing medium has been rotated by said printing request means, said display control means decides and specifies the orientation at which the printing medium should be re-fed based upon the orientation at which the image has been rotated.

5. The apparatus according to claim 1, wherein
the characteristic information includes printing medium supply port information indicating whether the printing medium is to be supplied from a manual-insertion tray or from a cassette, and
said display control means further specifies information relating to the printing medium supply port based upon the printing medium supply port information.

6. The apparatus according to claim 3, wherein said display control means decides an orientation of the printing medium with respect to a printing medium supply port based upon an orientation at which the printing medium was originally fed, decides an orientation of an image with respect to the printing medium based upon the orientation at which the image is formed on the printing medium, and decides, based upon the position of the binding margin, an axis on which an image on a reverse side of the printing medium is to be turned over with respect to an image on a front side of the printing medium.

7. A printing control method for controlling a printing control apparatus to generate print data to be printed by a printing apparatus that prints on a first side of a printing medium and that prints on a second side of the printing medium after re-feeding by an operator, said method comprising:
a setting input step of entering a printing setting;
a printing request step of deciding, based on characteristic information of the printing apparatus, a page order in which the printing apparatus is to be made to output pages to perform printing on both sides of the printing medium, and causing the printing apparatus to perform printing in the decided order; and
a display control step of, in a case where a number of pages printed in said printing request step has reached half a total number of pages to be printed, controlling a graphical display to indicate how the operator should re-feed the printing medium, of which the printing apparatus has printed on one side, to the printing apparatus, based upon the printing setting entered in said setting input step.

8. The method according to claim 7, wherein
the printing setting includes a reduction and layout setting for reducing a size of a plurality of pages and printing pages of reduced size on one side of the printing medium, and,
if a reduction and layout setting has been set, said printing request step reduces each page to create new pages and, based on a number of the new pages, decides a page order in which the new pages are to be output.

9. The method according to claim 7, wherein
the printing setting includes information relating to an orientation at which an image is formed on the printing medium and a position of a binding margin of the printing medium, and
said display control step decides and specifies an orientation at which the printing medium should be re-fed based upon an orientation at which the printing medium was originally fed, the orientation at which the image is formed on the printing medium, and the position of the binding margin.

10. The method according to claim 9, wherein, if an orientation of an image with respect to the printing medium has been rotated in said printing request step, said display control step decides and specifies the orientation at which the printing medium should be re-fed based upon the orientation at which the image has been rotated.

11. The method according to claim 7, wherein
the characteristic information includes printing medium supply port information indicating whether the printing medium is to be supplied from a manual-insertion tray or from a cassette, and
said display control step includes specifying information relating to the printing medium supply port based upon the printing medium supply port information.

12. The method according to claim 9, wherein said display control step includes deciding an orientation of the printing medium with respect to a printing medium supply port based upon an orientation at which the printing medium was originally fed, deciding an orientation of an image with respect to the printing medium based upon the orientation at which the image is formed on the printing medium, and deciding, based upon the position of the binding margin, an axis on which an image on a reverse side of the printing medium is to be turned over with respect to an image on a front side of the printing medium.

13. A printing system comprising a printing apparatus that prints on a first side of a printing medium and that prints on a second side of the printing medium after re-feeding by an operator, and a printing control apparatus that generates print data to be printed by said printing apparatus,
wherein said printing control apparatus includes:
setting input means for entering a printing setting; and
printing request means for deciding, based on characteristic information of said printing apparatus, a page order in which said printing apparatus is to be made to output pages to perform printing on both sides of the printing medium, and for causing said printing apparatus to perform printing in the decided order, and
wherein said printing apparatus includes display control means for, in a case where a number of pages printed by the printing request means has reached half a total number of pages to be printed, controlling a graphical display to indicate how the operator should re-feed the printing medium, of which said printing apparatus has printed on one side, to said printing apparatus, based upon the printing setting entered by the setting input means.

14. A storage medium storing a computer-readable program to be executed in a printing control apparatus that generates print data to be printed by a printing apparatus that prints on a first side of a printing medium and that prints on a second side of the printing medium after re-feeding by an operator, the program comprising:

setting input means for entering a printing setting;

printing request means for deciding, based on characteristic information of the printing apparatus, a page order in which the printing apparatus is to be made to output pages to perform printing on both sides of the printing medium, and for causing the printing apparatus to perform printing in the decided order; and display control means for, in a case where a number of pages printed by said printing requesting means has reached half a total number of pages to be printed, controlling a graphical display to indicate how the operator should re-feed the printing medium, of which the printing apparatus has printed on one side, to the printing apparatus, based upon the printing setting entered by said setting input means.

15. The storage medium according to claim 14, wherein the printing setting includes a reduction and layout setting for reducing a size of a plurality of pages and for printing pages of reduced size on one side of the printing medium, and, if a reduction and layout setting has been set, said printing request means reduces each page to create new page and, based on a number of the new pages, decides a page order in which the new pages are to be output.

16. The storage medium according to claim 14, wherein the printing setting includes information relating to an orientation at which an image is formed on the printing medium and a position of a binding margin of the printing medium, and said display control means decides and specifies an orientation at which the printing medium should be re-fed based upon an orientation at which the printing medium was originally fed, the orientation at which the image is formed on the printing medium, and the position of the binding margin.

17. The storage medium according to claim 16, wherein, if an orientation of an image with respect to the printing medium has been rotated by said printing request means, said display control means decides and specifies the orientation at which the printing medium should be re-fed based upon the orientation at which the image has been rotated.

18. The storage medium according to claim 14, wherein the characteristic information includes printing medium supply port information indicating whether the printing medium is to be supplied from a manual-insertion tray or from a cassette, and said display control means further specifies information relating to the printing medium supply port based upon the printing medium supply port information.

19. The storage medium according to claim 16, wherein said display control means decides an orientation of the printing medium with respect to a printing medium supply port based upon an orientation at which the printing medium was originally fed, decides an orientation of an image with respect to the printing medium based upon the orientation at which the image is formed on the printing medium, and decides, based upon the position of the binding margin, an axis on which an image on a reverse side of the printing medium is to be turned over with respect to an image on a front side of the printing medium.

20. A program product used to implement a printing control method for controlling a printing control apparatus to generate print data to be printed by a printing apparatus that prints on a first side of a printing medium and that prints on a second side of the printing medium after re-feeding by an operator, said program product comprising:

program code for a setting input step of entering a printing setting;

program code for a printing request step of deciding, based on characteristic information of the printing apparatus, a page order in which the printing apparatus is to be made to output pages to perform printing on both sides of the printing medium, and causing the printing apparatus to perform printing in the decided order; and program code for a display control step of, in a case where a number of pages printed in the printing request step has reached half a total number of pages to be printed, controlling a graphical display to indicate how the operator should re-feed the printing medium, of which the printing apparatus has printed on one side, to the printing apparatus, based upon the printing setting entered in the setting input step.

21. The program product according to claim 20, wherein the printing setting includes a reduction and layout setting for reducing a size of a plurality of pages and printing pages of reduced size on one side of the printing medium, and, if a reduction and layout setting has been set, the printing request step reduces each page to create new pages and, based on a number of the new pages, decides a page order in which the new pages are to be output.

22. The program product according to claim 20, wherein the printing setting includes information relating to an orientation at which an image is formed on the printing medium and a position of a binding margin of the printing medium, and the display control step decides and specifies an orientation at which the printing medium should be re-fed based upon an orientation at which the printing medium was originally fed, the orientation at which the image is formed on the printing medium, and the position of the binding margin.

23. The program product according to claim 22, wherein, if an orientation of an image with respect to the printing medium has been rotated in the printing request step, the display control step decides and specifies the orientation at which the printing medium should be re-fed based upon the orientation at which the image has been rotated.

24. The program product according to claim 20, wherein the characteristic information includes printing medium supply port information indicating whether the printing medium is to be supplied from a manual-insertion tray or from a cassette, and the display control step includes specifying information relating to the printing medium supply port based upon the printing medium supply port information.

25. The program product according to claim 22, wherein the display control step includes deciding an orientation of the printing medium with respect to a printing medium supply port based upon an orientation at which the printing medium was originally fed, deciding an orientation of an image with respect to the printing medium based upon the orientation at which the image is formed on the printing medium, and deciding, based upon the position of the binding margin, an axis on which an image on a reverse side of the printing medium is to be turned over with respect to an image on a front side of the printing medium.

26. A print data generating method for generating print data corresponding to a plurality of pages to be printed by a printing apparatus that prints on a first side of a printing medium and that prints on a second side of the printing medium rearranged by an operator, said method comprising the steps of:

generating print data corresponding to a page to be printed on a first side of a sheet of recording medium by the printing apparatus;

generating print data corresponding to a page to be printed on a second side of the sheet of recording medium by the printing apparatus;

selecting a set of rearrangement information from a plurality of sets of rearrangement information based upon an orientation of the print data, each of the plurality of sets of rearrangement information indicating how the operator should re-feed the printing medium that the printing apparatus has printed on the first side to the printing apparatus; and graphically outputting the selected set of rearrangement information.

27. The method according to claim 26, wherein the selected set of rearrangement information is displayed on a host computer as a dialogue message in said outputting step.

28. The method according to claim 26, wherein the selected set of rearrangement information is outputted to the printing apparatus in a visible form in said outputting step.

29. The method according to claim 26, wherein a set of rearrangement information is selected based upon an orientation of a printing medium and a position of a binding margin of the printing medium, and an orientation at which the printing medium should be re-fed is decided based upon an orientation at which the printing medium was originally fed.

30. The method according to claim 29, wherein, if a direction of an image with respect to the print data to be printed on a print medium has been rotated in said generating steps, the orientation at which the printing medium should be re-fed is decided based upon the direction at which the image has been rotated.

31. The method according to claim 26, wherein the plurality of sets of rearrangement information includes an orientation at which a printing medium should be re-fed, and the orientation is decided based upon a printing medium supply port information indicating whether the printing medium is to be supplied from a manual-insertion tray or from a cassette.

32. The method according to claim 29, wherein the plurality of sets of rearrangement information includes an orientation at which the printing medium should be re-fed the orientation being decided based upon an orientation at which the printing medium was originally fed, and an orientation of an image with respect to the printing medium is decided based upon an orientation at which an image is formed on the printing medium and the position of the binding margin.

33. An apparatus for generating print data corresponding to a plurality of pages to be printed by a printing apparatus that prints on a first side of a printing medium and that prints on a second side of the printing medium rearranged by an operator, said apparatus comprising:

a first print data generator adapted to generate print data corresponding to a page to be printed on a first side of a sheet of recording medium by the printing apparatus;

a second print data generator adapted to generate print data corresponding to a page to be printed on a second side of the sheet of recording medium by the printing apparatus;

a selector adapted to select a set of rearrangement information from a plurality of sets of rearrangement information based upon an orientation of the print data, each of the plurality of sets of rearrangement information indicating how the operator should re-feed the printing medium that the printing apparatus has printed on the first side to the printing apparatus; and an output unit adapted to graphically output the selected set of rearrangement information.

34. The apparatus according to claim 33, wherein the selected set of rearrangement information is displayed on a host computer as a dialogue message by said output unit.

35. The apparatus according to claim 33, wherein the selected set of rearrangement information is outputted to the printing apparatus in a visible form by said output unit.

36. The apparatus according to claim 33, wherein a set of rearrangement information is selected based upon an orientation of a printing medium and a position of a binding margin of the printing medium, and an orientation at which the printing medium should be re-fed is decided based upon an orientation at which the printing medium was originally fed.

37. The apparatus according to claim 36, wherein, if a direction of an image with respect to the print data to be printed on a print medium has been rotated by said first and second print data generators, the orientation at which the printing medium should be re-fed is decided based upon the direction at which the image has been rotated.

38. The apparatus according to claim 33, wherein the plurality of sets of rearrangement information includes an orientation at which a printing medium should be re-fed, and the orientation is decided based upon a printing medium supply port information indicating whether the printing medium is to be supplied from a manual-insertion tray or from a cassette.

39. The apparatus according to claim 36, wherein the plurality of sets of rearrangement information includes an orientation at which the printing medium should be re-fed, the orientation being decided based upon an orientation at which the printing medium was originally fed, and an orientation of an image with respect to the printing medium is decided based upon an orientation at which an image is formed on the printing medium and the position of the binding margin.

40. A computer-readable storage medium storing a program for implementing a print data generating method for generating print data corresponding to a plurality of pages to be printed by a printing apparatus that prints on a first side of a printing medium and that prints on a second side of the printing medium rearranged by an operator, the program comprising:

program code for generating print data corresponding to a page to be printed on a first side of a sheet of recording medium by the printing apparatus;

program code for generating print data corresponding to a page to be printed on a second side of the sheet of recording medium by the printing apparatus;

program code for selecting a set of rearrangement information from a plurality of sets of rearrangement information based upon an orientation of the print data., each of the plurality of sets of rearrangement information indicating how the operator should re-feed the printing medium that the printing apparatus has printed on the first side to the printing apparatus; and program code for graphically outputting the selected set of rearrangement information.

41. The storage medium according to claim 40, wherein the selected set of rearrangement information is displayed on a host computer as a dialogue message in the outputting step.

42. The storage medium according to claim 40, wherein the selected set of rearrangement information outputted to the printing apparatus in a visible form in the outputting step.

43. The storage medium according to claim 40, wherein a set of rearrangement information is selected based upon an orientation of a printing medium and a position of a binding margin of the printing medium, and an orientation at which the printing medium should be re-fed is decided based upon an orientation at which the printing medium was originally fed.

44. The storage medium according to claim 43, wherein, if a direction of an image with respect to the print data to be printed on a print medium has been rotated in the generating steps, the orientation at which the printing medium should be re-fed is decided based upon the direction at which the image has been rotated.

45. The storage medium according to claim 40, wherein the plurality of sets of rearrangement information includes an orientation at which a printing medium should be re-fed, and the orientation is decided based upon a printing medium supply port information indicating whether the printing medium is to be supplied from a manual-insertion tray or from a cassette.

46. The storage medium according to claim 43, wherein the plurality of sets of rearrangement information includes an orientation at which the printing medium should be re-fed, the orientation being decided based upon an orientation at which the printing medium was originally fed, and an orientation of an image with respect to the printing medium is decided based upon an orientation at which an image is formed on the printing medium and the position of the binding margin.

47. A program product for implementing a print data generating method for generating print data corresponding to a plurality of pages to be printed by a printing apparatus that prints on a first side of a printing medium and that prints on a second side of the printing medium rearranged by an operator, said program product comprising:

program code for generating print data corresponding to a page to be printed on a first side of a sheet of recording medium by the printing apparatus;

program code for generating print data corresponding to a page to be printed on a second side of the sheet of recording medium by the printing apparatus;

program code for selecting a set of rearrangement information from a plurality of sets of rearrangement information based upon an orientation of the print data, each of the plurality of sets of rearrangement information indicating how the operator should re-feed the printing medium that the printing apparatus has printed on the first side to the printing apparatus; and program code for graphically outputting the selected set of rearrangement information.

48. The program product according to claim 47, wherein the selected set of rearrangement information is displayed on a host computer as a dialogue message in the outputting step.

49. The program product according to claim 47, wherein the selected set of rearrangement information is outputted to the printing apparatus in a visible form in the outputting step.

50. The program product according to claim 47, wherein a set of rearrangement information is selected based upon an orientation of a printing medium and a position of a binding margin of the printing medium, and an orientation at which the printing medium should be re-fed is decided based upon an orientation at which the printing medium was originally fed.

51. The program product according to claim 50, wherein, if a direction of an image with respect to the print data to be printed on a print medium has been rotated in the generating steps, the orientation at which the printing medium should be re-fed is decided based upon the direction at which the image has been rotated.

52. The program product according to claim 47, wherein the plurality of sets of rearrangement information includes an orientation at which a printing medium should be re-fed, and the orientation is decided based upon a printing medium supply port information indicating whether the printing medium is to be supplied from a manual-insertion tray or from a cassette.

53. The program product according to claim 50, wherein the plurality of sets of rearrangement information includes an orientation at which the printing medium should be re-fed, the orientation being decided based upon an orientation at which the printing medium was originally fed, and an orientation of an image with respect to the printing medium is decided based upon an orientation at which an image is formed on the printing medium and the position of the binding margin.

* * * * *

UNITED STATES PATENT AND TRADEMARK OFFICE
CERTIFICATE OF CORRECTION

PATENT NO. : 6,278,524 B1
DATED : August 21, 2001
INVENTOR(S) : Yasuhiro Kujirai et al.

It is certified that error appears in the above-identified patent and that said Letters Patent is hereby corrected as shown below:

Column 1,
Line 6, "EL" should read -- a --.

Column 3,
Line 52, "Laser" should read -- laser --.

Column 4,
Line 36, "ROM :3" should read -- ROM 3 --.

Column 6,
Line 6, "print:" should read -- print --.

Column 8,
Line 51, "in dependence" should read -- depending --.

Column 9,
Line 38, "request" should read -- requested --.
Line 64, "satisfied.," should read -- satisfied, --.

Column 12,
Line 37, "which the" should read -- at which --.

Column 13,
Line 2, "in" should read -- is --; and "The" should read -- This --.
Line 9, "setting" should read -- setting is --.
Line 53, "from:" should read -- front --.

Column 15,
Line 23, "81:" should read -- 81. --.

UNITED STATES PATENT AND TRADEMARK OFFICE
CERTIFICATE OF CORRECTION

PATENT NO. : 6,278,524 B1
DATED : August 21, 2001
INVENTOR(S) : Yasuhiro Kujirai et al.

It is certified that error appears in the above-identified patent and that said Letters Patent is hereby corrected as shown below:

Column 21,
Line 55, "re-fed" should read -- re-fed, --.

Column 23,
Line 3, "data.," should read -- data, --.
Line 14, "outputted" should read -- is outputted --.

Signed and Sealed this

Second Day of April, 2002

Attest:

JAMES E. ROGAN
*Attesting Officer*   *Director of the United States Patent and Trademark Office*